US009690706B2

(12) United States Patent
Pal et al.

(10) Patent No.: US 9,690,706 B2
(45) Date of Patent: Jun. 27, 2017

(54) CHANGING CACHE OWNERSHIP IN CLUSTERED MULTIPROCESSOR

(71) Applicant: Intel Corporation, Santa Clara, CA (US)

(72) Inventors: Rahul Pal, Bangalore (IN); Ishwar Agarwal, Hillsboro, OR (US); Manoj K. Arora, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 7 days.

(21) Appl. No.: 14/668,831

(22) Filed: Mar. 25, 2015

(65) Prior Publication Data

US 2016/0283374 A1 Sep. 29, 2016

(51) Int. Cl.
*G06F 12/08* (2016.01)
*G06F 12/084* (2016.01)
(52) U.S. Cl.
CPC .... *G06F 12/084* (2013.01); *G06F 2212/2542* (2013.01); *G06F 2212/271* (2013.01)
(58) Field of Classification Search
CPC ........... G06F 12/084; G06F 2212/2542; G06F 2212/271
See application file for complete search history.

(56) References Cited

U.S. PATENT DOCUMENTS

| | | | |
|---|---|---|---|
| 6,115,790 A | 9/2000 | Schimmel et al. | |
| 6,542,966 B1 | 4/2003 | Crawford et al. | |
| 7,055,007 B2 | 5/2006 | Flautner | |
| 8,037,476 B1 | 10/2011 | Shavit et al. | |
| 8,108,610 B1 | 1/2012 | Glasco et al. | |
| 8,219,996 B1 | 7/2012 | Morris | |
| 8,261,024 B1 | 9/2012 | Shavit et al. | |
| 8,429,656 B1 | 4/2013 | Duluk et al. | |
| 8,862,828 B2 | 10/2014 | Saraf et al. | |
| 2002/0046324 A1 | 4/2002 | Barroso et al. | |
| 2004/0226026 A1 | 11/2004 | Glass et al. | |
| 2005/0160430 A1* | 7/2005 | Steely, Jr. ........... | G06F 12/0817 719/310 |
| 2006/0004796 A1 | 1/2006 | Nakamura | |
| 2007/0156964 A1 | 7/2007 | Sistla | |

(Continued)

OTHER PUBLICATIONS

Tam, David. "Operating System Management of Shared Caches on Multicore Processors." U. of Toronto, 2010.

*Primary Examiner* — Yong Choe
(74) *Attorney, Agent, or Firm* — Lowenstein Sandler LLP

(57) ABSTRACT

Resolving coherency issues inherent in sharing distributed cache is described. A chip multiprocessor may include at least first and second processing clusters, each having multiple cores of a processor, multiple cache slices co-located with the multiple cores, and a memory controller (MC). The processor stores directory information in a memory coupled to the processor to indicate cluster cache ownership of a first address space to the first cluster. In response to a request to change the cluster cache ownership of the first address space, the processor may remap first lines of first cache slices, corresponding to the first address space, to second lines in second cache slices of the second cluster, and update the directory information (e.g., a state of the first cache lines) to change the cluster cache ownership of the first address space to the second cluster. One of the MCs may manage such updating of the directory.

25 Claims, 18 Drawing Sheets

(56) References Cited

U.S. PATENT DOCUMENTS

| | | |
|---|---|---|
| 2008/0022261 A1 | 1/2008 | Gooding |
| 2008/0126750 A1 | 5/2008 | Sistla |
| 2009/0049248 A1 | 2/2009 | Clark et al. |
| 2009/0089470 A1 | 4/2009 | van de Ven |
| 2009/0193064 A1 | 7/2009 | Chen et al. |
| 2009/0265514 A1 | 10/2009 | Biles et al. |
| 2010/0257316 A1 | 10/2010 | Arimilli et al. |
| 2011/0087840 A1 | 4/2011 | Glasco et al. |
| 2011/0119397 A1 | 5/2011 | Evans et al. |
| 2011/0153936 A1 | 6/2011 | Starke |
| 2011/0173394 A1 | 7/2011 | Gara et al. |
| 2011/0179199 A1 | 7/2011 | Chen et al. |
| 2011/0219208 A1 | 9/2011 | Asaad et al. |
| 2011/0252216 A1 | 10/2011 | Ylonen et al. |
| 2011/0296406 A1 | 12/2011 | Bhandari et al. |
| 2013/0073811 A1 | 3/2013 | Beckmann et al. |
| 2013/0085999 A1 | 4/2013 | Tung et al. |
| 2013/0311724 A1 | 11/2013 | Walker et al. |
| 2014/0006715 A1 | 1/2014 | Saraf et al. |

\* cited by examiner

| Cache Presence 810 | | Dir State 820 | Snoop Targets 830 |
|---|---|---|---|
| Socket | SNC | | |
| None | None | I | Home skt, Home SNC |
| Home | Home | I | Home skt, Home SNC |
| Home | Any | PA/A | If PA->Home Skt, All SNC<br>If A->All skt, All SNC |
| Any | Home | A | All skt, All SNC |
| Any | Any | A | All skt, All SNC |

US 9,690,706 B2

CHANGING CACHE OWNERSHIP IN CLUSTERED MULTIPROCESSOR

The present disclosure pertains to the field of processors and, in particular, to optimizing cache/storage management techniques in a multiprocessor.

BACKGROUND

Advances in semi-conductor processing and logic design have permitted an increase in the amount of logic that may be present on integrated circuit devices. As a result, computer system configurations have evolved from a single or multiple integrated circuits in a system to multiple cores, multiple hardware threads, and multiple logical processors present on individual integrated circuits. A processor or integrated circuit typically includes a single physical processor die, where the processor die may include any number of cores, hardware threads, or logical processors. The ever increasing number of processing elements—cores, hardware threads, and logical processors—on integrated circuits enables more tasks to be accomplished in parallel. However, the execution of more threads and tasks put an increased premium on shared resources, such as memory/cache and the management thereof.

Traditional chip multiprocessor (CMP) architectures incorporate a shared and distributed cache structure. Cache slices of a cache may be co-located with respective cores on a CMP because physically closest cache involves quicker access times. All cores on a CMP, however, usually have access to all cache slices on the CMP. An address maps to a unique cache slice based on an address hash function, which determines cache ownership for the address. While beneficial to optimize cache usage in a flexible manner, sharing distributed cache by multiple cores creates coherency challenges. As just one example, if a change in an address hash function of portions of cache lines is triggered (e.g., due to powering down certain cores and co-located cache lines due to low utilization), then the CMP is quiesced and all affected cache addresses are flushed. This action causes a significant negative impact on performance, as the CMP determines affected cache lines and executes the flush, causing delays in the order of milliseconds. Thus, there is a need to more efficiently handle hash changes in CMPs with distributed cache architectures.

DESCRIPTION OF EMBODIMENTS

Resolving coherency issues inherent in dynamic cache ownership changes between distributed processing clusters is described. Multiple sockets may exist on a system on a chip (SoC), where each socket may be a chip multiprocessor (CMP) and the SoC may thus also be considered a CMP. A CMP may include multiple clusters each having multiple cores of a processor, a plurality of cache slices co-located with the multiple cores, and a memory controller. The processor (e.g., CMP) may store directory information in a memory coupled to the processor to indicate cluster cache ownership of a first address space to the first cluster. In response to a request to change the cluster cache ownership of the first address space, the processor may remap first lines of first cache slices, corresponding to the first address space, to second lines in second cache slices of the second cluster, and update the directory information (e.g., a state of the first cache lines) to change the cluster cache ownership of the first address space to the second cluster.

One of the memory controllers may be designed to dynamically manage and update the directory based on cluster cache ownership changes (which may be triggered by changes to the address hash function of at least one cluster) that impact one or more cache lines of one or more of the clusters. In some cases, the one memory controller may block new read or write requests and drain any outstanding such requests issued on clusters affected by a cluster cache ownership change. The memory controller may do this to avoid any outstanding core write back requests to stale cache line locations, thus further resolving cache coherency issues.

In one example, a memory controller may remap at least some lines from first cache slices of a first cluster to second cache slices of a second cluster in response to a request to change cluster cache ownership of at least a portion of address space of the first cluster. The memory controller may also update the states in the directory associated with the first and/or second clusters to indicate the change of hash of the lines from the first cluster to the second cluster. Different states of the directory may be used to indicate whether and how far from a local socket or cluster should be snooped (or sniffed) to find a cached line. In this way, line changes within cache slices across clusters may be tracked and the time required to find a new memory location for the line is reduced. By this approach, which will be described in more detail, there is no need to quiesce and flush an entire CMP, greatly enhancing performance in CMPs with distributed shared cache across clusters.

Figure 1:
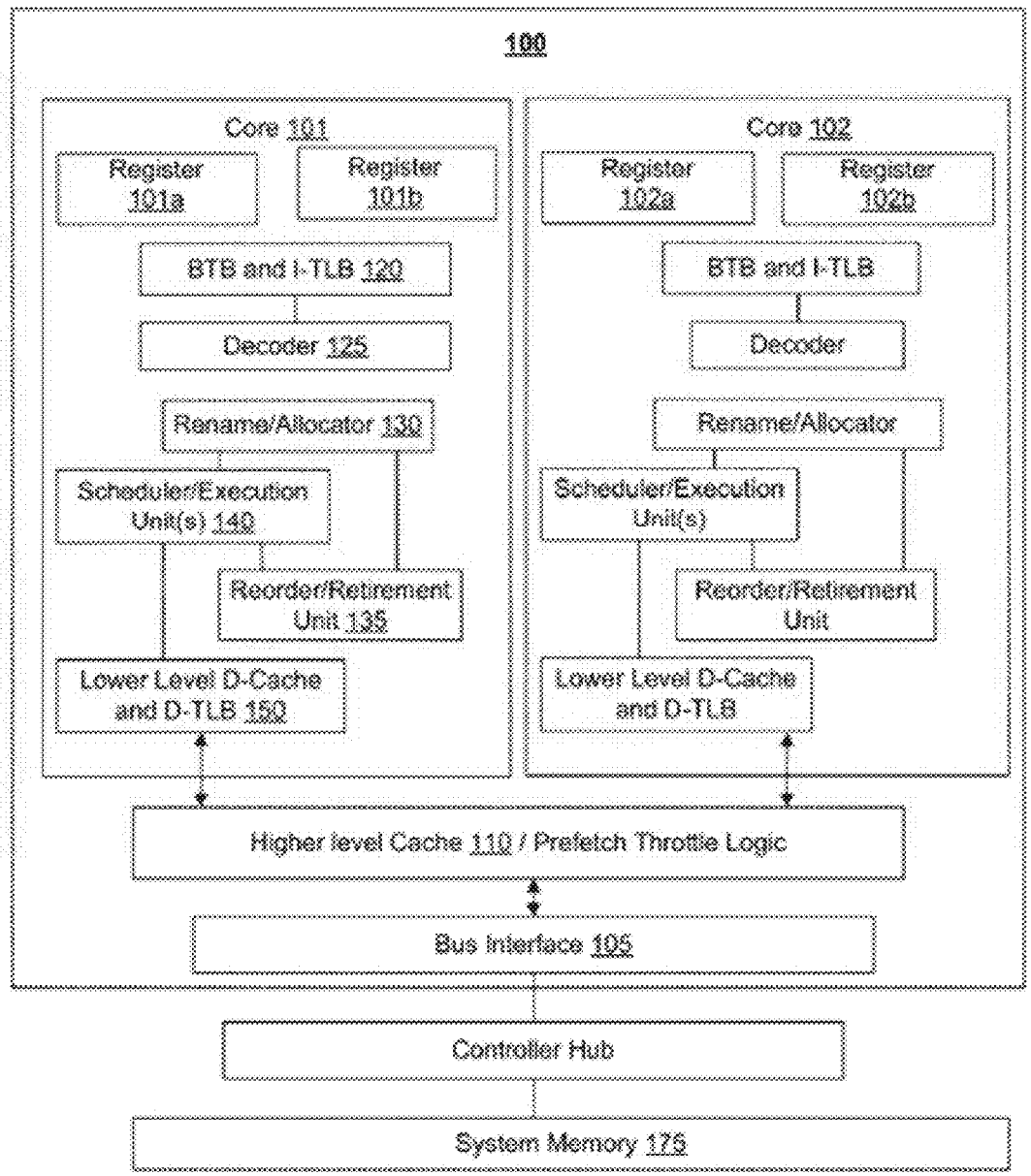
FIG. 1 is a processor including multiple processing elements according to an embodiment.

Referring to FIG. 1, an embodiment of a processor including multiple cores is illustrated. A processor 100, in one embodiment, includes one or more caches. Processor 100 includes any processor, such as a micro-processor, an embedded processor, a digital signal processor (DSP), a network processor, or other device to execute code. Processor 100, as illustrated, includes a plurality of processing elements.

In one embodiment, a processing element refers to a thread unit, a thread slot, a process unit, a context, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state wherein each independently maintained architectural state is associated with at least some dedicated execution resources. In contrast to cores, a hardware thread typically refers to any logic located on an integrated circuit capable of maintaining an independent architectural state wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

The physical processor 100, as illustrated in FIG. 1, includes two cores, core 101 and 102. Here, core hopping may be utilized to alleviate thermal conditions on one part of a processor. However, hopping from the core 101 to the core 102 may potentially create the same thermal conditions on the core 102 that existed on the core 101, while incurring the cost of a core hop. Therefore, in one embodiment, the processor 100 includes any number of cores that may utilize core hopping. Furthermore, power management hardware included in processor 100 may be capable of placing individual units and/or cores into low power states to save power. Here, in one embodiment, the processor 100 provides hardware to assist in low power state selection for these individual units and/or cores.

Although the processor 100 may include asymmetric cores, i.e. cores with different configurations, functional units, and/or logic, symmetric cores are illustrated. As a result, the core 102, which is illustrated as identical to the core 101, will not be discussed in detail to avoid repetitive discussion. In addition, the core 101 includes two hardware threads 101 $a$ and 101 $b$, while the core 102 includes two hardware threads 102 $a$ and 102 $b$. Therefore, software entities, such as an operating system, potentially view the processor 100 as four separate processors, i.e. four logical processors or processing elements capable of executing four software threads concurrently.

Here, a first thread is associated with architecture state registers 101 $a$, a second thread is associated with architecture state registers 101 $b$, a third thread is associated with architecture state registers 102 $a$, and a fourth thread is associated with architecture state registers 102 $b$. As illustrated, the architecture state registers 101 $a$ are replicated in the architecture state registers 101 $b$, so individual architecture states/contexts are capable of being stored for the logical processor 101 $a$ and the logical processor 101 $b$. Other smaller resources, such as instruction pointers and renaming logic in a rename allocater logic 130 may also be replicated for the threads 101 $a$ and 101 $b$. Some resources, such as a re-order buffers in reorder/retirement unit 135, an instruction-translation buffer (I-TLB) 120, load/store buffers, and queues may be shared through partitioning. Other resources, such as general purpose internal registers, a page-table base register, a low level data-cache and data-TLB 115, an execution unit(s) 140, and portions of an out-of-order (or reorder) unit 135 are potentially fully shared.

The processor 100 often includes other resources, which may be fully shared, shared through partitioning, or dedicated by/to processing elements. In FIG. 1, an embodiment of a purely exemplary processor with illustrative logical units/resources of a processor is illustrated. Note that a processor may include, or omit, any of these functional units, as well as include any other known functional units, logic, or firmware not depicted. The processor 100 may include a branch target buffer 120 to predict branches to be executed/taken and an I-TLB 120 to store address translation entries for instructions.

The processor 100 may further include a decode module 125, which may be coupled to a fetch unit, such as a buffer-to-buffer or I-TLB 120, to decode fetched elements. In one embodiment, the processor 100 is associated with an Instruction Set Architecture (ISA) that defines/specifies instructions executable on the processor 100. Here, machine code instructions recognized by the ISA may include a portion of the instruction referred to as an opcode, which references/specifies an instruction or operation to be performed.

In one example, the allocator (or renamer) 130 includes an allocator to reserve resources, such as register files, to store instruction processing results. The threads 101 $a$ and 101 $b$, however, are potentially capable of out-of-order execution, where the allocator and renamer 130 may also reserve other resources, such as reorder buffers to track instruction results. The allocator 130 may also include a register renamer to rename program/instruction reference registers to other registers internal to the processor 100. The reorder/retirement unit 135 may include components, such as the reorder buffers mentioned above, load buffers, and store buffers, to support out-of-order execution and later in-order retirement of instructions executed out-of-order.

Scheduler and execution unit(s) 140, in one embodiment, may include a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

A lower level data cache and data translation buffer (D-TLB) 150 may be coupled to the execution unit(s) 140. The data cache may store recently used/operated on elements, such as data operands, which are potentially held in memory coherency states. The D-TLB may store recent virtual/linear to physical address translations. As a specific example, a processor may include a page table structure to break physical memory into multiple virtual pages.

As depicted, the cores 101 and 102 share access to higher-level or further-out cache 110, which may cache recently fetched elements. Note that higher-level or further-out refers to cache levels increasing or getting farther way from the execution unit(s). In one embodiment, higher-level cache 110 is a last-level data cache (LLC)—last cache in the memory hierarchy on processor 100—such as a second or third level data cache. However, higher level cache 110 is not so limited, as it may be associated with or include an instruction cache. A trace cache—a type of instruction cache—instead may be coupled after the decoder 125 to store recently decoded traces.

The processor 100 may also include a bus interface module 105 to communicate with devices external to the processor 100, such as a system memory 175, a chipset, a northbridge, or other integrated circuit. The memory 175 may be dedicated to the processor 100 or shared with other devices in a system. Common examples of types of memory 175 may include dynamic random access memory (DRAM), static RAM (SRAM), non-volatile memory (NV memory), and other such storage devices.

Figure 2:
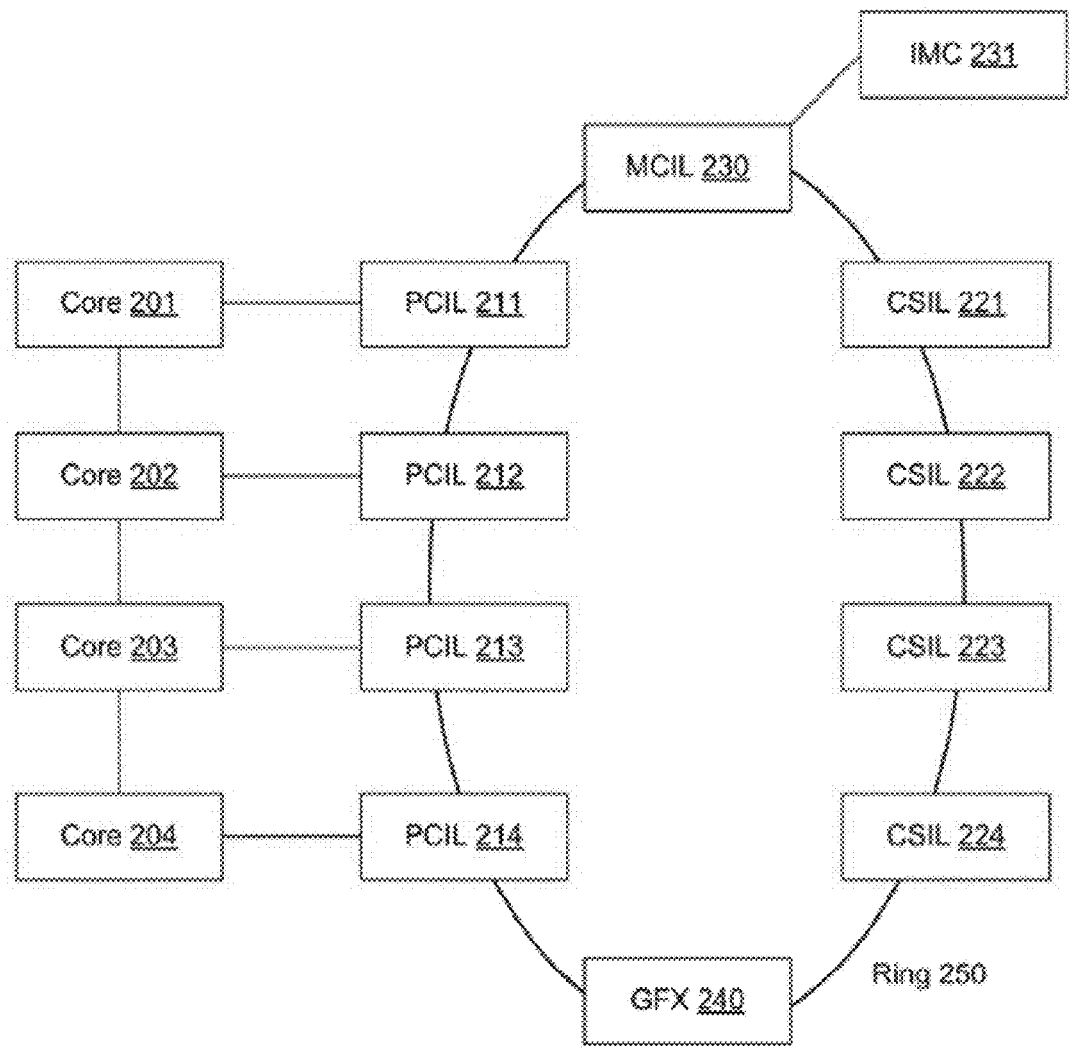
FIG. 2 illustrates on-core memory interface logic according to an embodiment.

FIG. 1 illustrates an abstracted, logical view of an exemplary processor with a representation of different modules, units, and/or logic. However, note that a processor utilizing the methods and apparatus' described herein need not include the illustrated units. And, the processor may omit some or all of the units shown. To illustrate the potential for a different configuration, the discussion now turns to FIG. 2, which depicts an embodiment of a processor 200 including an on-processor memory interface module—an uncore module—with a ring configuration to interconnect multiple cores. The processor 200 is illustrated including a physically distributed cache; a ring interconnect; as well as core, cache, and memory controller components. This depiction is purely illustrative, however, as a processor implementing the described methods and apparatus may include any processing elements, style or level of cache, and/or memory, front-side-bus or other interface to communicate with external devices.

In one embodiment, multiple caching agents 221-224 may each manage a slice of a physically distributed cache. As an example, each cache component, such as a component 221, is to manage a slice of a cache for a co-located core—a core the cache agent is associated with for purpose of managing the distributed slice of the cache. The cache agents 221-224 may be referred to as Cache Slice Interface Logic (CSIL) or as cache components, agents, or other such logic, units, or modules for interfacing with a cache or slice thereof. Note that the cache may be any level of cache; yet, for this exemplary embodiment, discussion focuses on a last-level cache (LLC) shared by the cores 201-204.

Much like cache agents handle traffic on ring interconnect 250 and interface with cache slices, multiple core agents/components 211-214 may handle traffic and interface with respective cores 201-204. The core agents 221-224 may be referred to as Processor Core Interface Logic (PCIL) or as core components, agents, or other such logic, units, or modules for interfacing with a processing element. Additionally, a ring 250 may include a Memory Controller Interface Logic (MCIL) 230 and a Graphics Hub (GFX) 240 to interface with other modules, such as memory controller (IMC) 231 and a graphics processor (not illustrated). However, ring 250 may include or omit any of the aforementioned modules, as well as include other known processor modules that are not illustrated. Additionally, similar modules may be connected through other known interconnects, such as a point-to-point interconnect or a multi-drop interconnect.

The methods and apparatus' described herein may be implemented in any cache at any cache level, or at any processor or processor level. Furthermore, caches may be organized in any fashion, such as being a physically or logically, centralized or distributed cache.

Figure 3:
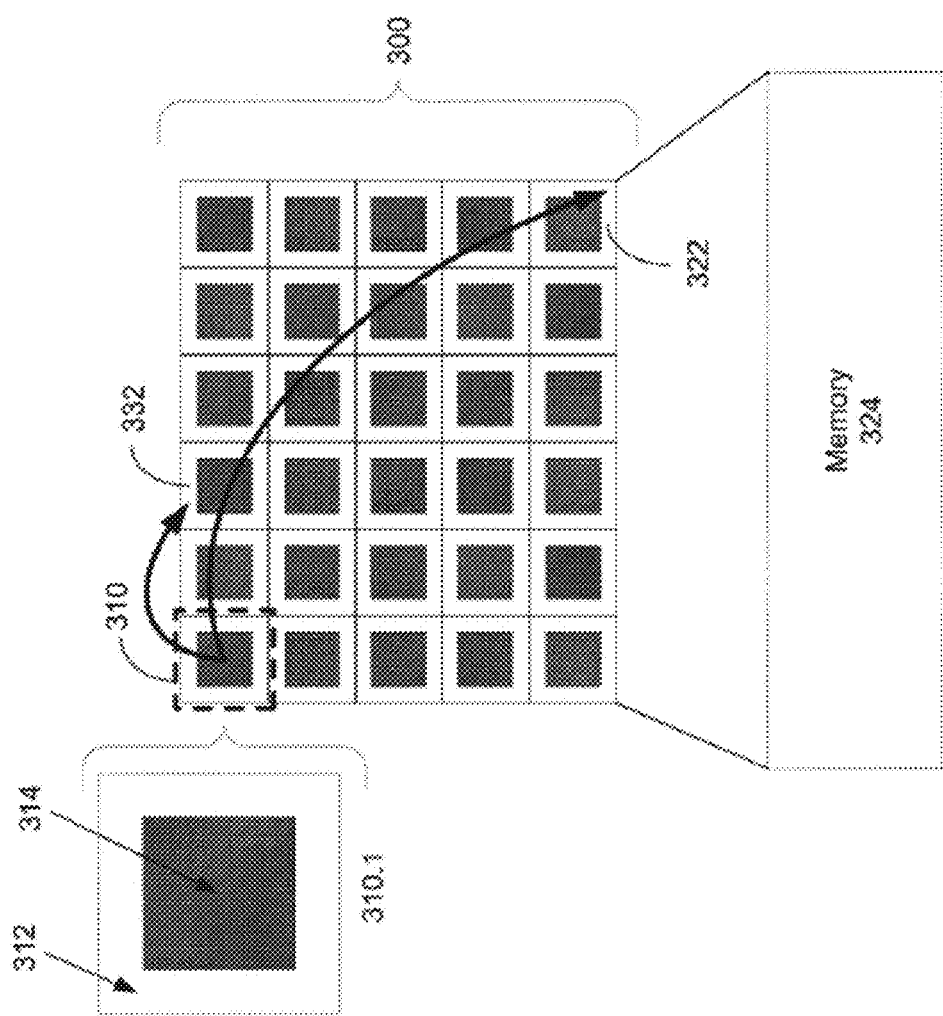
FIG. 3 illustrates a chip multiprocessor (CMP) according to an embodiment.

FIG. 3 illustrates a chip multiprocessor (CMP) 300 according to an embodiment. As discussed above, a computer processor may include multiple cores. Manufacturers typically integrate the cores onto a single integrated circuit die known as a chip multiprocessor (or CMP), or onto multiple dies in a single package. For example, the CMP 300 may include 6×5=30 cores. A magnified view 310.1 of a grouping of a single core and its co-located cache 310 is shown for illustration purposes. The magnified view 310.1 includes the core 314 and its respective co-located cache 312.

Traditional CMP architectures incorporate a shared and distributed cache structure. The contiguous address space from the memory 324 (for example, RAM), may be mapped across the cache slices of the CMP 300. Specifically, each memory address from memory 324 may be mapped to a cache slice of CMP 300 through a hash function. When data is retrieved and stored into a memory address, that data may be cached in the cache slice corresponding to that memory address. Typically, the hash function will attempt to distribute the memory addresses of memory 324 evenly across the cache slices of CMP 300. Therefore, when data is retrieved for processing, that data may be cached in any of the cache slices on the CMP 300. All cores have access to all cache slices on CMP 300. Thus, the time required by a core to access data depends on the distance between the core and the location of the cache slice where the data resides. For example, it will take a process/thread executing on the core 314 longer to access data from cache slice 322 than cache slice 332 since cache slice 322 is physically located farther away from core 314 than cache slice 332. Consequently, as the number of cores on a CMP increase, the average distance between cores and cache slices increases, which results in higher latency during cache access.

Figure 4:
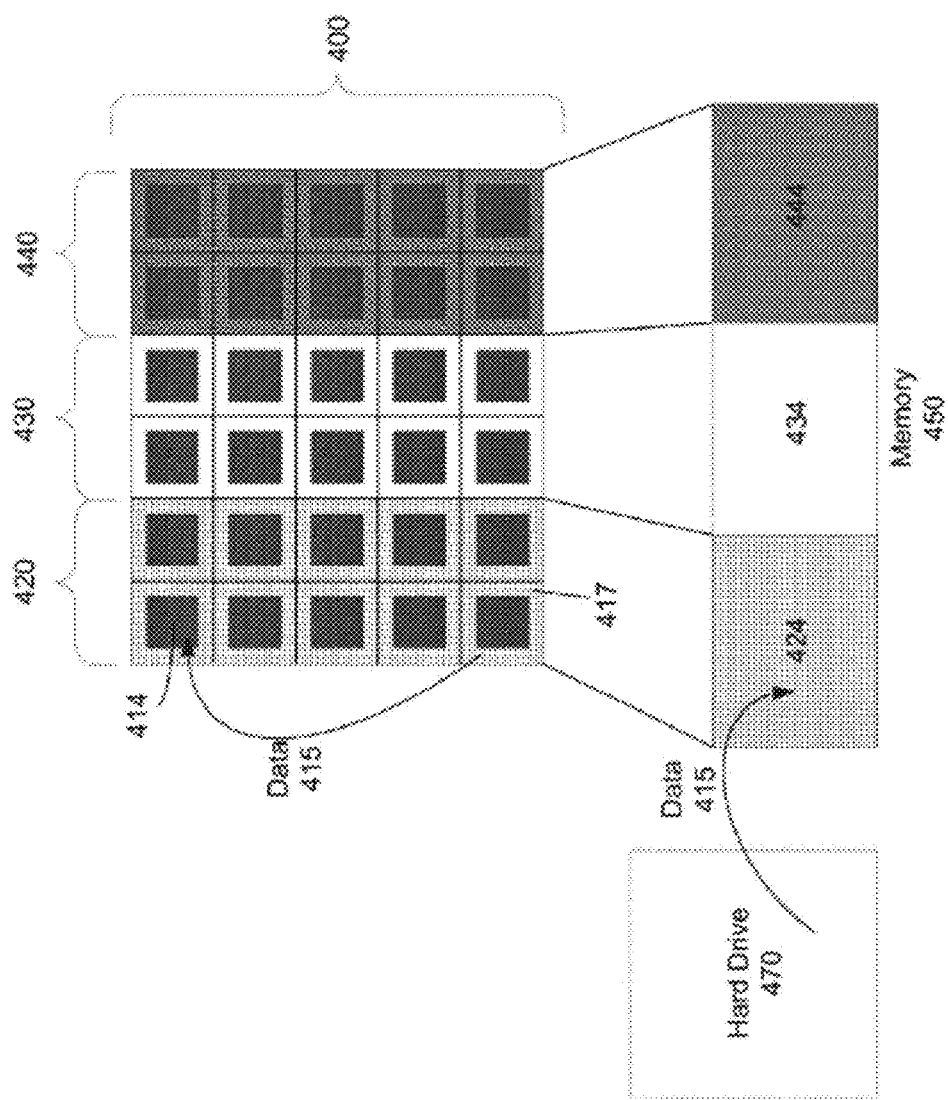
FIG. 4 is the CMP of FIG. 3 according to a further embodiment.

FIG. 4 illustrates a CMP 400 according to an embodiment. The CMP 400 in this example is logically separated into three clusters 420, 430 and 440, called sub-NUMA clusters (SNCs). Each SNC is a cluster of adjacent cores and the co-located cache slices grouped together. In an embodiment, the cache slices may be part of a last level cache (LLC), i.e., the last cache in the memory hierarchy on a processor, such as a second or third level cache.

The memory 450 may be soft partitioned into sub-NUMA address regions (SNARs) 424, 434, and 444 that are associated with the SNCs 420, 430 and 440, respectively. Each SNAR may be a contiguous portion of memory mapped to the cache slices of a corresponding SNC. The contiguous portion of memory may be physically and/or logically contiguous. For example, the addresses of the SNAR 424 may be evenly hashed to the cache slices of the SNC 420. Cache accesses of a core in a particular SNC may be biased to the SNAR associated with that particular SNC. In other words, when a core from a particular SNC requires data, that data may be stored in the SNAR associated with that particular SNC. For example, cache accesses of the core 414 may be biased to the SNAR 424. In an embodiment, such biasing may be implemented by making SNCs visible to an operating system as NUMA nodes.

In an embodiment, an SNC may be made visible to the operating system (OS) of the computer system through the basic input/output system (BIOS) as a NUMA node with the respective associated SNAR as the SNC's assigned memory address space. Peer SNCs within a CMP may be advertised as the most-adjacent NUMA nodes through mechanisms such as advanced configuration and power interface (ACPI) system locality distance information table (SLIT) used by operating systems such as LINUX. In an embodiment, the Windows operating system may detect NUMA adjacency through existing NUMA latency measurement scheme on remote NUMA nodes.

In an example embodiment, a process executed on the core 414 may require data 415. The first access of the data 415 may require retrieval of the data from a storage device such as a hard drive 470. Upon retrieval of the data 415 from the hard drive 450, the operating system may store it to the memory 450 in the SNAR 424 since the core 414 requesting the data 415 is located in the SNC 420 associated with SNAR 424. Given that the addresses of the SNAR 424 are hashed to the cache slices of the SNC 420, the data 215 may be available in the cache slice(s) of the SNC 420 for future requests.

Partitioning a CMP into SNCs and the memory into associated SNARs may decrease the cache latency since data required by a core will likely reside in a cache slice local to the core's SNC. In an embodiment, when the OS is unable to store the data 415 in the SNAR 424, for example, because the SNAR 424 is full, the OS may allocate the data 415 to the SNAR 434, since the SNAR 434 is associated with the SNC 430, which is the SNC physically closest to SNC 420.

Although FIG. 4 illustrates a CMP 400 which is separated into three SNCs with 10 cores each for ease of discussion, in other embodiments, the number of cores may vary from cluster to cluster and a CMP may include any number of clusters. Similarly, there does not have to be a one-to-one correspondence between the SNARs and the SNCs. In an embodiment, one or more SNCs may correspond to a single SNAR. In an embodiment, a single SNC may correspond to one or more SNARs. For further details and embodiments regarding SNARs biased to particular SNCs, please see U.S. Patent Application Publication No. 2014/0006715, which is hereby incorporated in its entirety by this reference.

Figure 5:
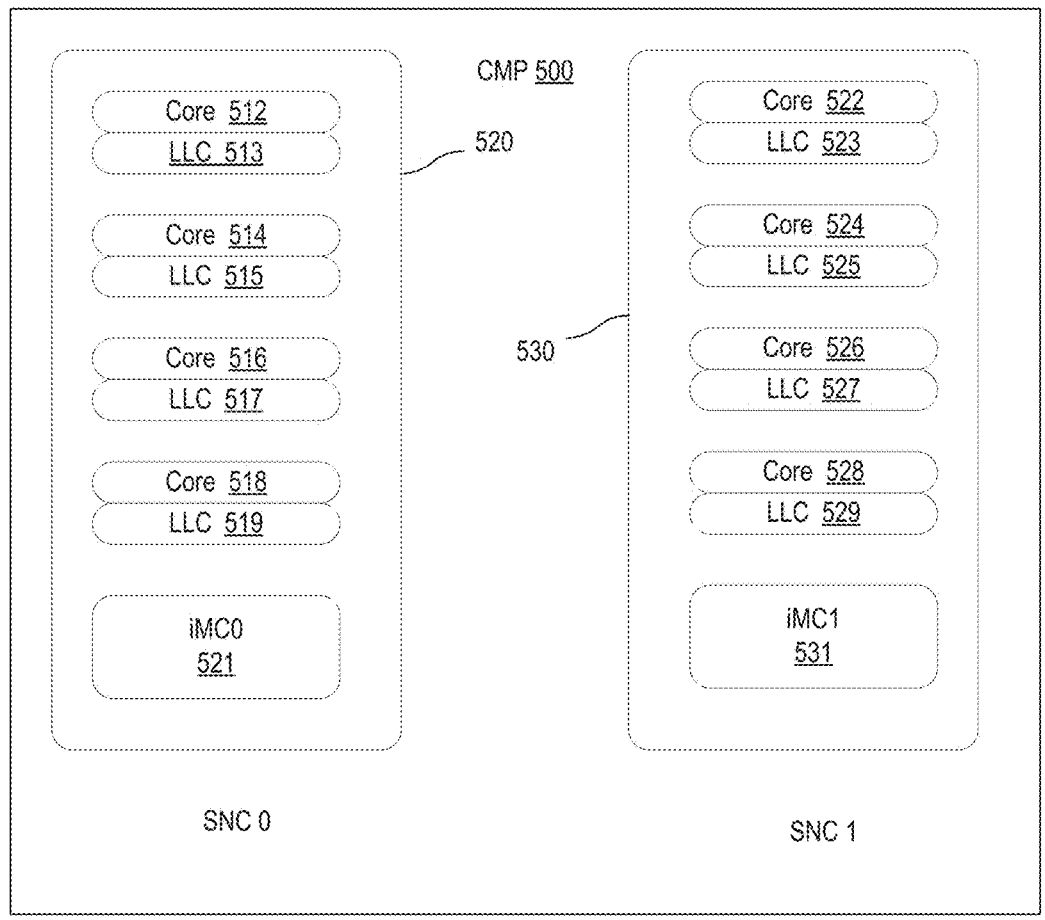
FIG. 5 is the CMP of FIGS. 3-4 with multiple processing clusters such as sub-NUMA (non-uniform memory access) clusters (SNC).

FIG. 5 is a multiprocessor (such as the CMP of FIGS. 3-4) with multiple sub-NUMA (non-uniform memory access) clusters (SNCs): SNC 0 labeled as 520 and SNC 1 labeled as 530 are displayed but more such clusters may be located on a CMP. The SNC0 may include multiple cores 512, 514, 516, and 518 and co-located cache slices 513, 515, 517, and 519, respectively. The SNC0 may also include an integrated memory controller (iMC0) 521 to aid in controlling hash assignments to the cache slices 513, 515, 517, and 519, and any changes in those hash assignments.

The SNC1 may include multiple cores 522, 524, 526 and 528 and co-located cache slices 523, 525, 527 and 529, respectively. The SNC1 may also include an integrated memory controller (iMC1) 522 to aid in controlling hash assignments to the cache slices 523, 525, 527 and 529, and any changes in those hash assignments. There may be fewer or more cores with co-located cache slices and the depiction in FIG. 5 is merely by way of example. The disclosed embodiments apply to any soft clustering scheme that allows cores a path to directly access cache of another cluster.

While dividing the CMP into multiple clusters, the biasing of the LLC hash discussed previously may maintain the entire CMP as a single quick path interconnect (QPI) caching agent. The LLC may remain a single logical cache shared across clusters. In an SNC cluster, each cluster may own a NUMA address range (of one or more address lines) that is assigned to the cache slices that lie within the cluster by way of an address hash function. This address space may also be allocated to memory channels located close to the cluster as discussed previously. Each SNC may be an independent NUMA node. The SNC clustering allows for a better scale number to clusters and provides lower LLC and memory access latencies.

The SNC clustering may restrict cache usable by any process (due to a limited address range) to a subset of the entire LLC available in a CMP. While this restriction may improve performance by lowering access latencies, there may be scenarios that would benefit from this restriction being dynamically relaxed. For example, some virtual machines may want cache sizes beyond that available within an SNC. Furthermore, it may benefit power consumption on a CMP or within sockets of the CMP if certain cache slices of the LLC are shut down at low load (e.g., shutting down an entire socket or one or more SNCs) by allowing cache in other SNCs to service active processes. Note that a socket may include a die with multiple cores, co-located cache slices, and at least one memory controller and may include multiple SNCs. Such sharing of cache slices may require the SNC address hash function to dynamically change, allowing a part or all of the address space of the affected cache slices to be remapped to another SNC cluster. Herein, the SNC from which address space is mapped is referred to as home_SNC and the SNC to which the address space is mapped is referred to as peer_SNC. In some examples, the peer_SNC may be the SNC located physically closest to the home_SNC, which reduces latencies in accessing the mappings by the multiple cores.

Figure 6A:
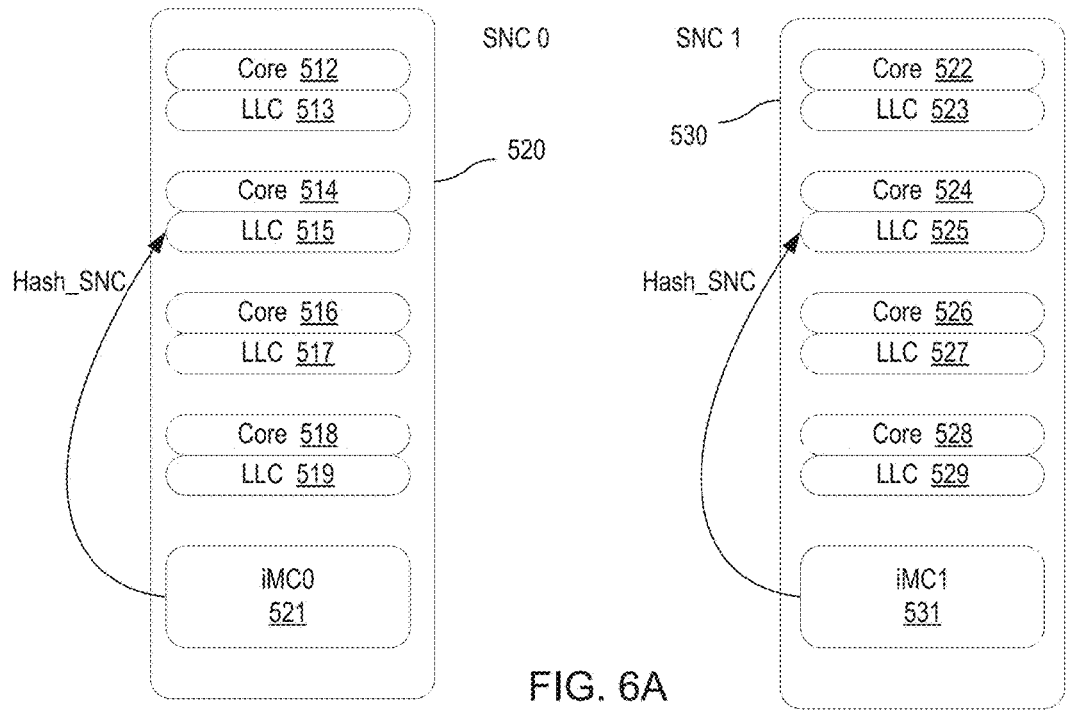
FIG. 6A is a block diagram of an embodiment of performing a change in address hash function within the SNCs of FIG. 5.

FIG. 6A is a block diagram of an embodiment of performing a change of address hash function within the SNCs of FIG. 5. In one embodiment of a hashing scheme, to effect a change in address hash function between SNCs while maintaining cache coherency, the entire multiprocessor (or CMP) is quiesced and all the affected addresses that are cached in the LLC flushed. Because this involves the quiesce of the entire CMP, impact on performance is usually significant due to a long flush time, e.g., the memory controller 521 (and/or 531) needs to search through the entire SNC's cache to find addresses that are affected by the hash change (Hash_SNC in FIG. 6A) and flushed. This expense makes this scheme unviable for most practical applications, particularly at today's faster access speeds, causing delays on the order of milliseconds.

Figure 6B:
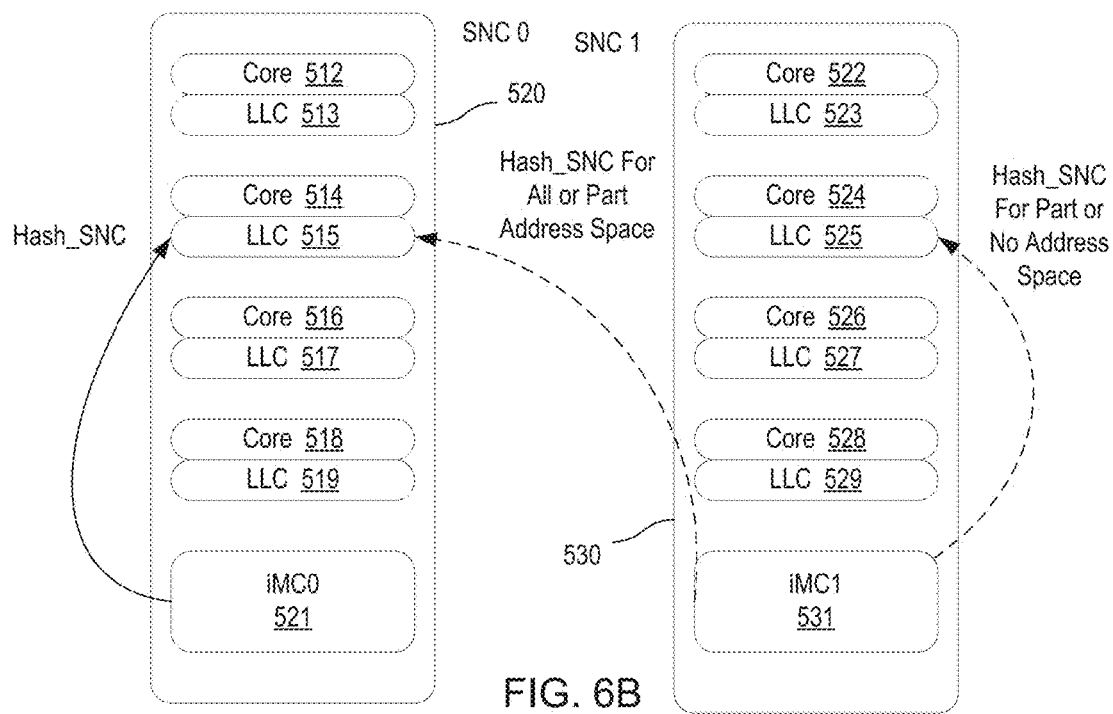
FIG. 6B is a block diagram of the SNC's of FIG. 5, depicting an address hash function change according to the present disclosure.

The present disclosure describes a way to coherently achieve the cache address ownership change between clusters dynamically, without quiesce of the entire CMP for long periods and/or flushing of the cache. FIG. 6B is a block diagram of the SNC's of FIG. 5, depicting a change of cache cluster ownership according to the present disclosure. While this process will be described in more detail, FIG. 6B explains that the Hash_SNC efforts are to move or map the addresses of the affected cache lines from SNC1 to SNC0. This may be all or part of the address space. In the case of mapping just a part of the address space, then only a partial mapping occurs for the affected addresses. While some searching occurs, there is no need for a quiesce and flush where those addresses are now available in SNC0.

Figures 7, 8:
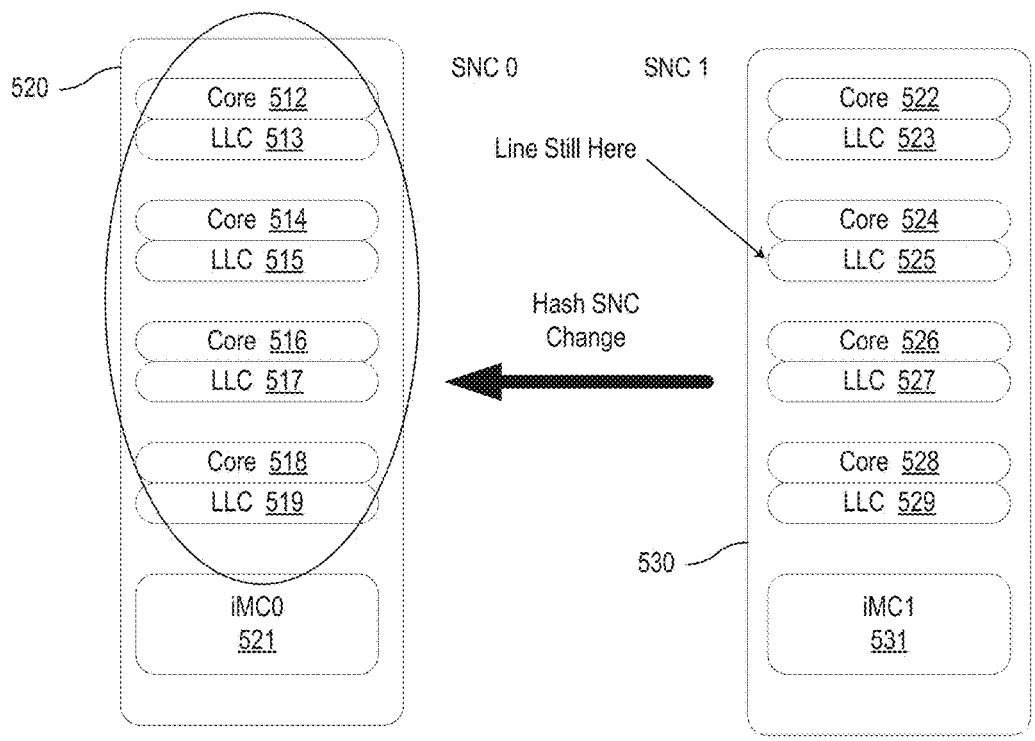
FIG. 7 is the block diagram of FIG. 6A, depicting a stale cache line ownership due to an address hash function change.
FIG. 8 is a table including an exemplary directory construct and corresponding states for tracking memory line allocation of cache slices shared by multiple SNCs.

While no quiesce and flush are required that impacts the entire CMP, FIG. 7 illustrates a stale cache line ownership due to the hash change from SNC1 to SNC0. As shown, there are now two cache slice locations for the lines (at LLC 525 and somewhere in the LLC of SNC0), such that an address in SNC1 is now stale. The stale cache line could remain active until flushed for other reasons or until taken over by yet another change in cluster cache ownership (e.g., due to a change in the address hash function).

To handle tracking of the mapped lines due to changes in cluster cache ownership, a directory may be used in conjunction with data memory so that the CMP is aware of where in the LLC to look after a hash change between SNCs. Directory information may be stored with memory data for every line and a memory read may cause a memory controller to seek out (or snoop or listen at) identified sockets and SNCs based on a current state of the line in the directory. The SNC clusters may belong to the same QPI caching agent or other cache device.

FIG. 8 is a table including an exemplary directory construct 800 and corresponding states for tracking memory line allocation of cache slices shared by multiple SNCs of a CMP. Note that "skt" is short for "socket." The directory may include a cache presence indicator 810, which may be broken down according to socket and SNC, a directory state 820, and a snoop target 830. To "snoop" refers to listening or sniffing for data at a memory (including cache) storage location.

There may be three different states 820 in this example, as follows. A first state, referred to as "I" for idle, indicates that a line can only be cached in a locket socket (e.g., home_SNC). So, when the home_SNC socket looks for the cache line there is no need to snoop in remote sockets or SNCs, which saves time. A second state, referred to as "A" for "any," means that the line is cached in a remote socket. A third state, referred to as "PA," refers to the line being cached in a peer_SNC, or in other words, a physically closest SNC to the home_SNC and not in a remote socket (which avoids excess snoops to remote sockets).

With further reference to FIG. 8, when the line is cached in home_SNC in the local socket, the directory state is updated to "I." When the line is cached in any peer_SNC (local socket) or in any remote socket, then the directory state is updated to an "A" because remote sockets are to be snooped. When the line is cached in a peer_SNC and not in a remote socket, the directory state is updated to "PA." Any snoop that reads directory as PA may snoop all active peer_SNCs and ignore remote sockets.

For any request that reads the directory state as "PA/A," the memory controller need only snoop active peer_SNCs. All requests may always snoop home_SNC in local socket memory reads, unless the local socket is inactive or is the requestor and has verified a miss in local cache slices. Invalidating snoops may be used to snoop the clusters for all local requests to avoid unnecessary sharing between clusters.

Figure 9:
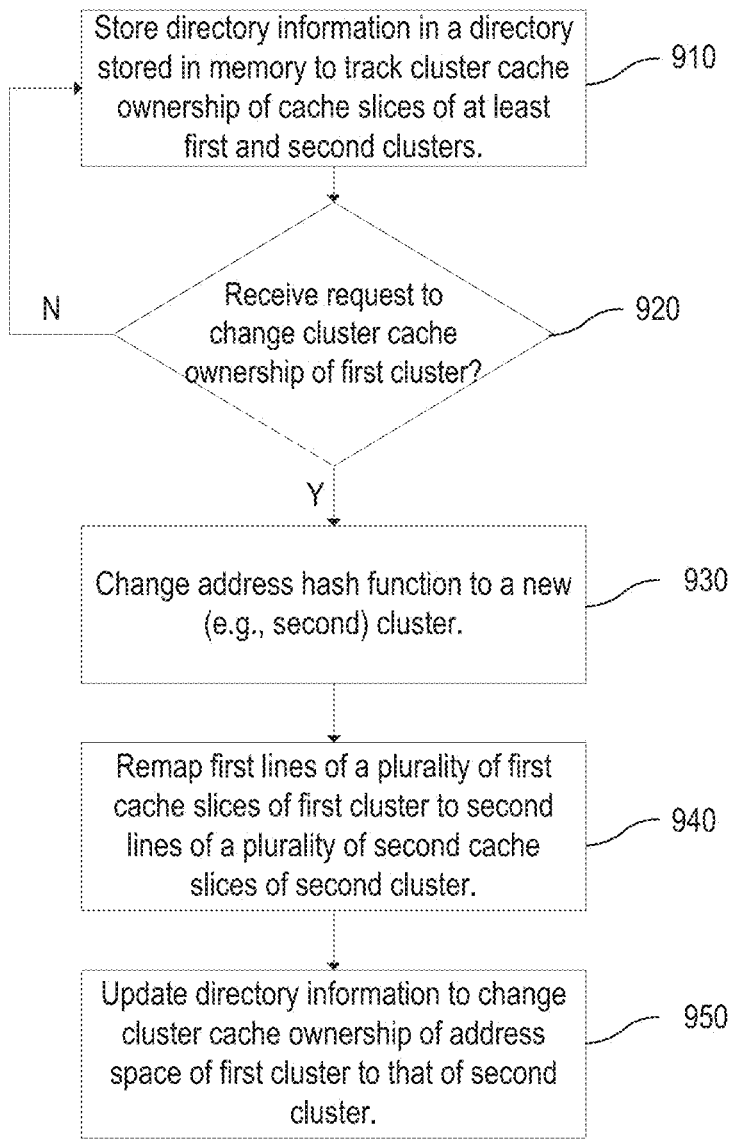
FIG. 9 is a flow diagram of an exemplary method for using a directory associated with data memory to track memory line allocation of lines reassigned to another cluster.

FIG. 9 is a flow diagram of an exemplary method for using a directory associated with data memory to track memory line allocation of lines reassigned to another cluster. The method may include, for example, storing directory information in a directory stored in memory, the directory information to track cluster cache ownership of cache slices of at least first and second clusters, the first and second clusters each comprising a plurality of cores of a processor, a plurality of cache slices co-located with the plurality of cores, and a memory controller (910). The method may further include receiving a request to change cluster cache ownership of the first cluster (920). The method may further include changing an address hash function from the first cluster to a new (e.g., the second) cluster (930), for example, as a result of the request and the reason for the change in cluster cache ownership. The method may further include remapping first lines of a first plurality of cache slices of the first cluster to second lines in a second plurality of cache slices of the second cluster in response to a request to change the cluster cache ownership of a first address space of the first cluster to a second address space of the second cluster (940). The method may further include updating the directory information to change the cluster cache ownership of the first address space to the second cluster (950).

Figure 10A:
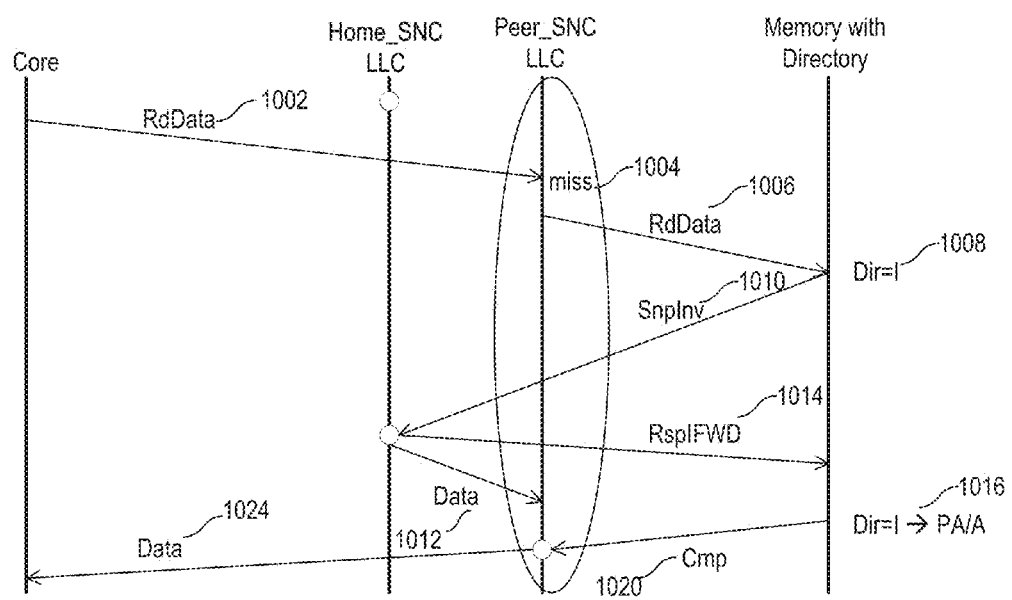
FIG. 10A is a flow diagram of an embodiment for forwarding a cache line and updating the directory after a change of an address hash function from a home SNC to a physically closest SNC.
Figure 10B:
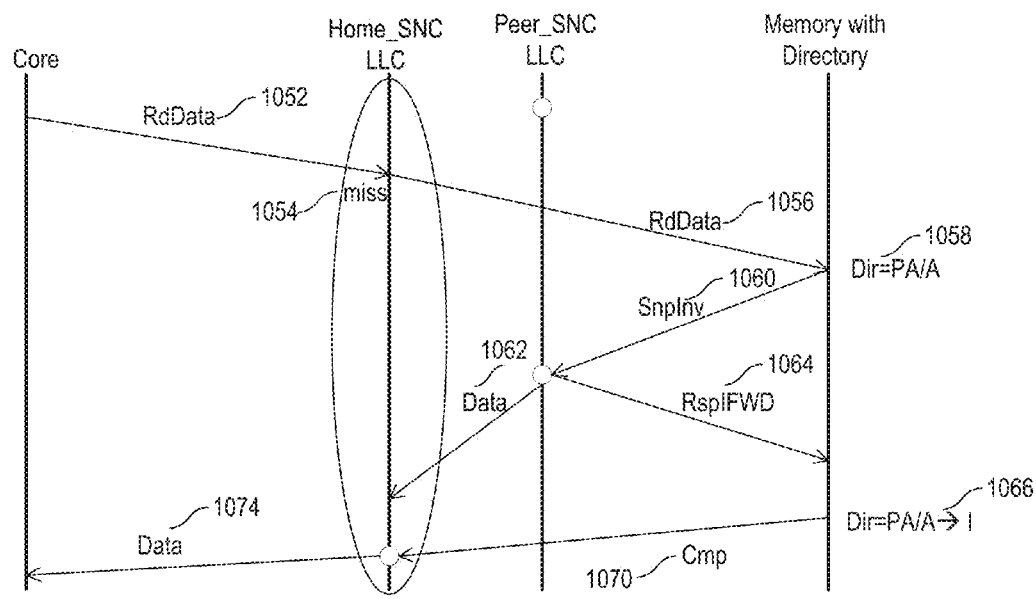
FIG. 10B is a flow diagram of an embodiment for forwarding the cache line and updating the directory after the home SNC in FIG. 10A regains ownership of the cache line.

FIGS. 10A and 10B provide an example of changes of address hash function across cache slices of multiple SNCs, and a way in which a memory controller may update states in the directory for an affected cache line. For example, FIG. 10A is a flow diagram of an embodiment for using the directory of FIG. 8 to handle forwarding a cache line and updating the directory after a change of address hash function from a home_SNC to a physically-closest SNC, e.g., a peer_SNC. As long as the line remains under home_SNC ownership in the local socket, the directory state 820 may be "I." While a single "line" is referred to for simplicity, multiple cache lines may be impacted and thus treated as a group according to the disclosed methods.

After a hash change to the peer_SNC, a core sends a data request for an address line (1002) to the peer_SNC instead of to the home_SNC. In FIG. 10A, the core receives a miss (1004) to the peer_SNC because the line has not yet been forwarded to the peer_SNC. The peer_SNC then sends the data request (1006) to the memory with which is associated the directory, where the line carries a state of "I" (1008).

Because the memory controller always snoops the home_SNC (assuming not powered down), the memory initiates a snoop (1010) towards the home_SNC. The "Snpinv" stands for "invalidating snoop," indicating that the home_ SNC will invalidate the cache line and write the data back to memory or forward the cache line to a next requester. Accordingly, the home_SNC finds the data still in a cache slice of the home_SNC and forwards the data (1012) on to the peer_SNC to be stored in a cache line to which the hash has changed. The home_SNC may also respond to the memory (1014), informing the memory about the forwarded data with an "I" status, indicating that the final state of the line in the snoop recipient's cache (home_SNC) is invalid.

The memory controller may then update the directory (1016) to change the state of the line from "I" to "PA" (or "A" if a line was from a remote socket) due to the forwarding of the data to the new cache line in the peer_SNC. The method completes (1020) with the memory controller sending the data from the newly cached line (in the peer_SNC) to the core in response to the core's initial data request (1024).

FIG. 10B is a flow diagram of an embodiment for forwarding the cache line and updating the directory after the home_SNC in FIG. 10A regains ownership of the cache line. A core requests data from an address line (1052). Because of the change of address hash function back to the home_SNC, the request initially goes to the home_SNC. The request results in a miss at the home_SNC (1054) because the line has not yet been forwarded back to the home_SNC. The request may then be forwarded to the memory (1056), which has a state of "PA/A" in the directory associated with the memory (1058). This may be because, earlier, the hash changed and the line now sits in the peer_SNC (or physically closest) cache.

Due to the PA/A directory state, a snoop is initiated to the peer_SNC (1060). The peer_SNC may then forward data from the line as previously cached to the home_SNC (1062) to be stored in a new cache line according to the ownership regained by the home_SNC. The peer_SNC may also respond to the memory (1064), informing the memory about the forwarded data with an "I" status, indicating that the final state of the line in the snoop recipient's cache (peer_SNC) is invalid. The memory controller may then update the directory state of the cached line for the peer_SNC as "I" for invalid (1066).

The memory and the home_SNC then complete the change of cluster cache ownership (1070) by sending the data from the home_SNC cached location to the core in response to the core's original data request (1074).

Figure 11:
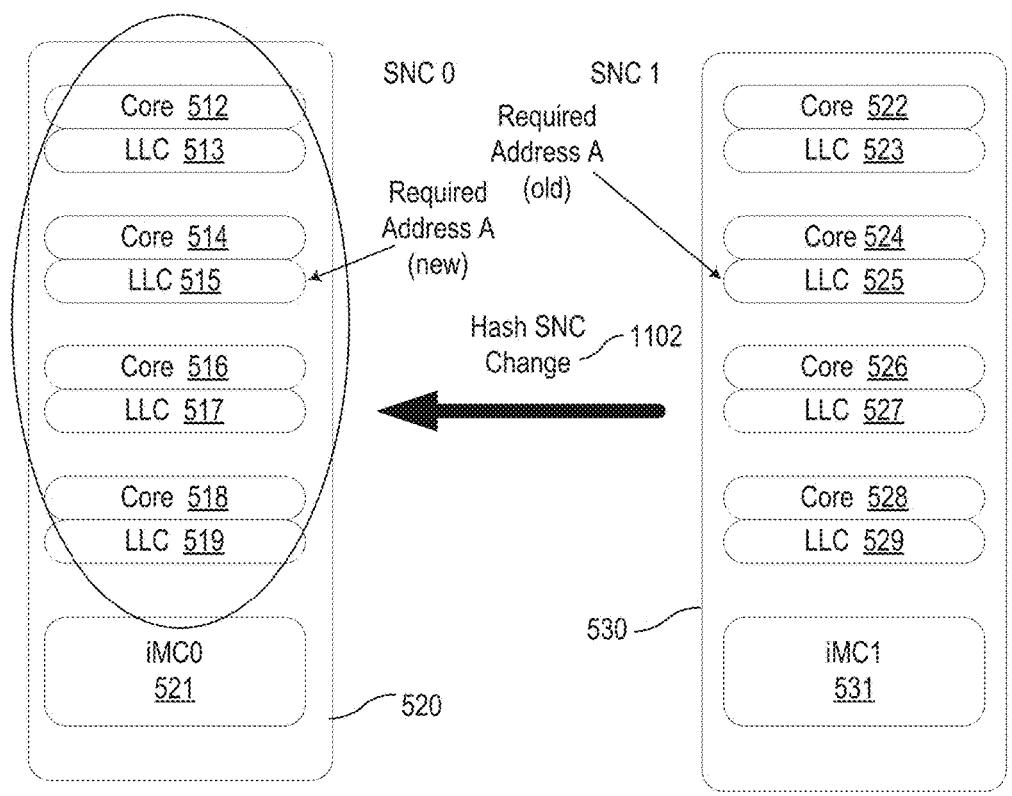
FIG. 11 is a block diagram indicating a state of two SNC's during an address hash function change occurring between a read and a subsequent write back by a core.

FIG. 11 is a block diagram indicating a state of two SNC's (such as those in FIG. 5) during an address hash function change occurring between a read and a subsequent write back by a core. As illustrated, the SNC1 530 has a line (Address A) in a location in LLC 525 that is old. Due to a change in address hash function (1102), Address A has a new location in LLC 515 of SNC0 520. For this example, a core write back is attempted to SNC1, but that location is now stale. This could happen if the ownership changes (e.g., due to a change address hash function) (1102) between a core originally requesting the line and its subsequent write back to that line. The result is a coherency issue in which an old request may access a previous hash location (LLC 525) while a new request accesses the same line in the new location (LLC 515).

Figure 12:
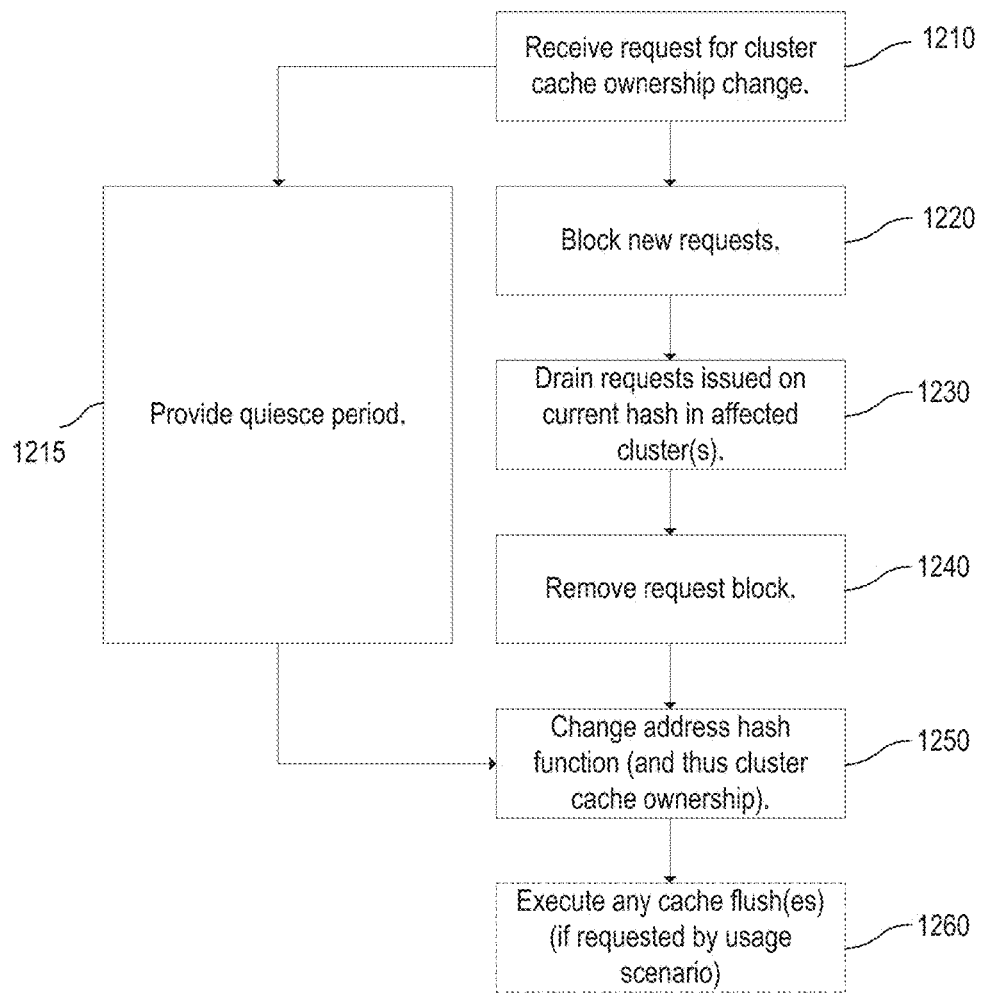
FIG. 12 is a flow chart of an exemplary method for providing a brief quiesce period to avoid coherency issue as presented in FIG. 11.

To resolve this coherency issue, the present disclosure introduces a quiesce period and an optional flush as described with reference to FIG. 12, which illustrates a flow chart of an exemplary method for providing a brief quiesce period after a request is received for a cache ownership change. The method may begin with receiving a request for cluster cache ownership change between clusters (SNCs) (1210). The method may continue by providing a brief quiesce period (1215) during which the method may block new read/write requests on clusters affected by a change in cluster cache ownership (1220), drain requests issued on the current hash in affected clusters (1230), and remove the request block (1230). The quiesce period may be on the order of nanoseconds compared with the order of milliseconds required to quiesce and flush the entire CMP as previously discussed. The method may then proceed to change cluster cache ownership as requested (1250). In some usage scenarios, a cache flush of old memory locations may be required (1260), e.g., when the cache slices are being prepared to receive new data. Any such flush would occur outside of the quiesce period of block 1215.

Figure 13A:
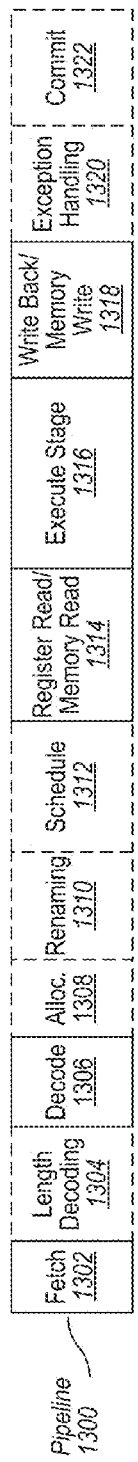
FIG. 13A is a block diagram illustrating an in-order pipeline and a register renaming stage, out-of-order issue/execution pipeline according to one embodiment.

FIG. 13A is a block diagram illustrating a micro-architecture for a processor 1300 that implements dynamic cache hash changes between SNCs according to one embodiment. Specifically, processor 1300 depicts an in-order architecture core and a register renaming logic, out-of-order issue/execution logic to be included in a processor according to at least one embodiment of the disclosure. The embodiments of the page additions and content copying can be implemented in processor 1300.

Processor 1300 includes a front end unit 1330 coupled to an execution engine unit 1350, and both are coupled to a memory unit 1370. The processor 1300 may include a reduced instruction set computing (RISC) core, a complex instruction set computing (CISC) core, a very long instruction word (VLIW) core, or a hybrid or alternative core type. As yet another option, processor 1300 may include a special-purpose core, such as, for example, a network or communication core, compression engine, graphics core, or the like. In one embodiment, processor 1300 may be a multi-core processor or may be part of a multiprocessor system.

The front end unit 1330 includes a branch prediction unit 1332 coupled to an instruction cache unit 1334, which is coupled to an instruction translation lookaside buffer (TLB) 1336, which is coupled to an instruction fetch unit 1338, which is coupled to a decode unit 1340. The decode unit 1340 (also known as a decoder) may decode instructions, and generate as an output one or more micro-operations, micro-code entry points, microinstructions, other instructions, or other control signals, which are decoded from, or which otherwise reflect, or are derived from, the original instructions. The decoder 1340 may be implemented using various different mechanisms. Examples of suitable mechanisms include, but are not limited to, look-up tables, hardware implementations, programmable logic arrays (PLAs), microcode read only memories (ROMs), etc. The instruction cache unit 1334 is further coupled to the memory unit 1370. The decode unit 1340 is coupled to a rename/allocator unit 1352 in the execution engine unit 1350.

The execution engine unit 1350 includes the rename/allocator unit 1352 coupled to a retirement unit 1354 and a set of one or more scheduler unit(s) 1356. The scheduler unit(s) 1356 represents any number of different schedulers, including reservations stations (RS), central instruction window, etc. The scheduler unit(s) 1356 is coupled to the physical register file(s) unit(s) 1358. Each of the physical register file(s) units 1358 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 1358 is overlapped by the retirement unit 1354 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.).

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 1354 and the physical register file(s) unit(s) 1358 are coupled to the execution cluster(s) 1360. The execution cluster(s) 1360 includes a set of one or more execution units 1362 and a set of one or more memory access units 1364. The execution units 1362 may perform various operations (e.g., shifts, addition, subtraction, multiplication) and operate on various types of data (e.g., scalar floating point, packed integer, packed floating point, vector integer, vector floating point).

While some embodiments may include a number of execution units dedicated to specific functions or sets of functions, other embodiments may include only one execution unit or multiple execution units that all perform all functions. The scheduler unit(s) 1356, physical register file(s) unit(s) 1358, and execution cluster(s) 1360 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1364). It should also be understood that where separate pipelines are used, one or more of these pipelines may be out-of-order issue/execution and the rest in-order.

The set of memory access units 1364 is coupled to the memory unit 1370, which may include a data prefetcher 1380, a data TLB unit 1372, a data cache unit (DCU) 1374, and a level 2 (L2) cache unit 1376, to name a few examples. In some embodiments DCU 1374 is also known as a first level data cache (L1 cache). The DCU 1374 may handle multiple outstanding cache misses and continue to service incoming stores and loads. It also supports maintaining cache coherency. The data TLB unit 1372 is a cache used to improve virtual address translation speed by mapping virtual and physical address spaces. In one exemplary embodiment, the memory access units 1364 may include a load unit, a store address unit, and a store data unit, each of which is coupled to the data TLB unit 1372 in the memory unit 1370. The L2 cache unit 1376 may be coupled to one or more other levels of cache and eventually to a main memory.

In one embodiment, the data prefetcher 1380 speculatively loads/prefetches data to the DCU 1374 by automatically predicting which data a program is about to consume. Prefetching may refer to transferring data stored in one memory location (e.g., position) of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

The processor 1300 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes a separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 13B:
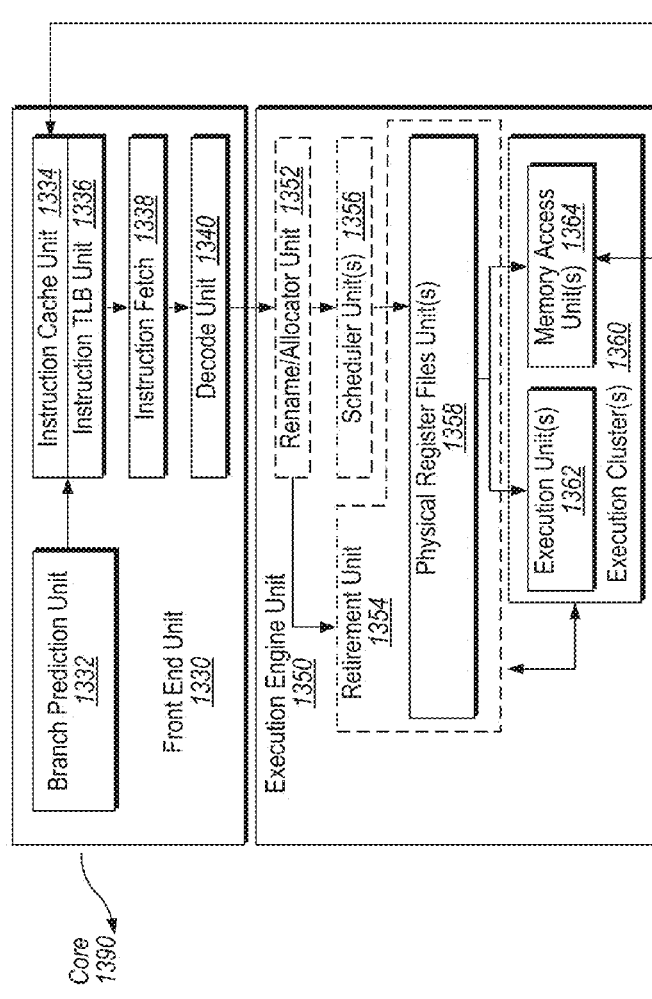
FIG. 13B is a block diagram illustrating a micro-architecture for a processor that implements dynamic cache hash changes between SNCs according to one embodiment.

FIG. 13B is a block diagram illustrating an in-order pipeline and a register renaming stage, out-of-order issue/execution pipeline implemented by processor 1300 of FIG. 13A according to some embodiments of the disclosure. The solid lined boxes in FIG. 13B illustrate an in-order pipeline, while the dashed lined boxes illustrates a register renaming, out-of-order issue/execution pipeline. In FIG. 13B, a processor pipeline 1300 includes a fetch stage 1302, a length decode stage 1304, a decode stage 1306, an allocation stage 1308, a renaming stage 1310, a scheduling (also known as a dispatch or issue) stage 1312, a register read/memory read stage 1314, an execute stage 1316, a write back/memory write stage 1318, an exception handling stage 1322, and a commit stage 1324. In some embodiments, the ordering of stages 1302-1324 may be different than illustrated and are not limited to the specific ordering shown in FIG. 13B.

Figure 14:
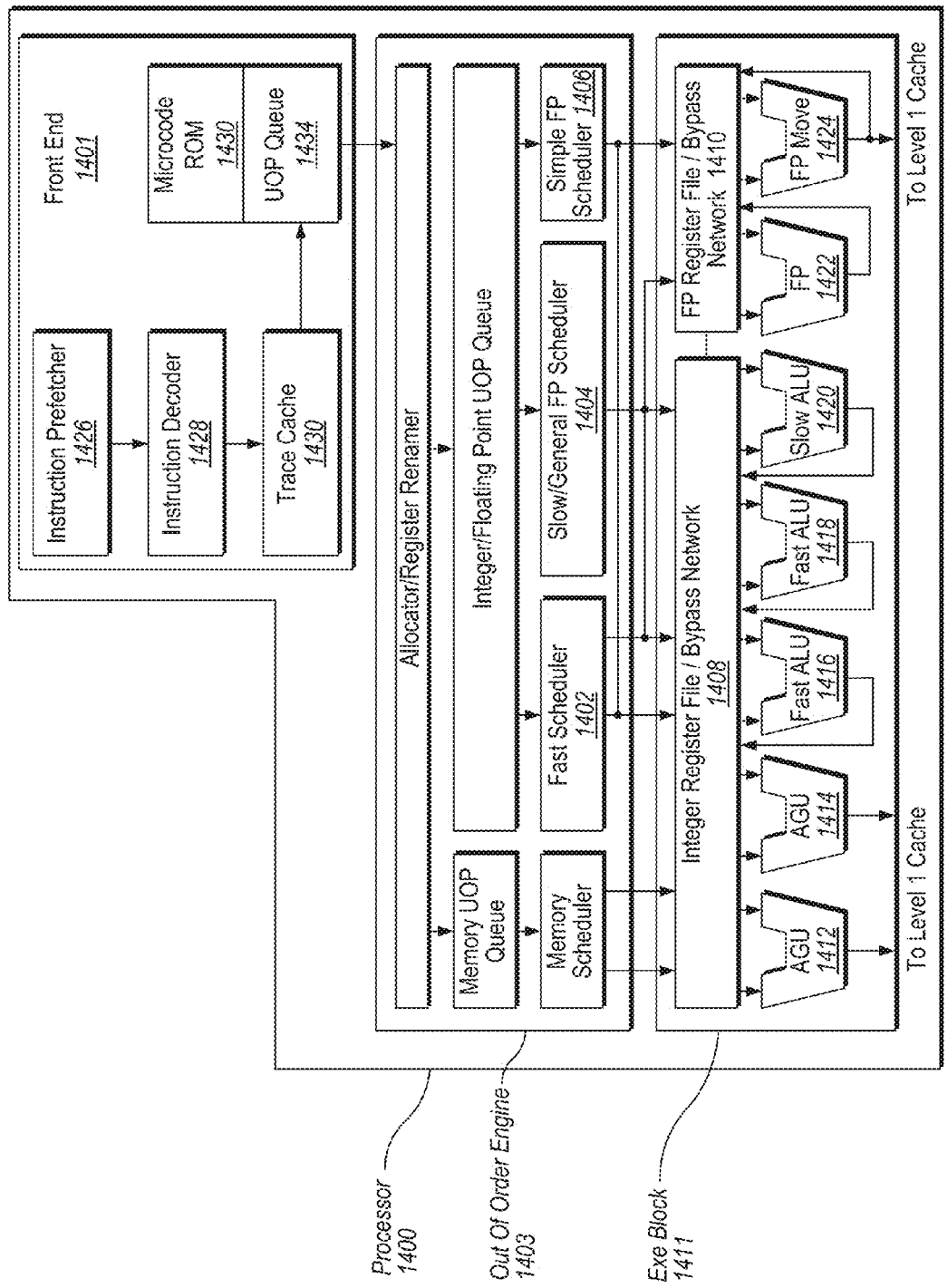
FIG. 14 illustrates a block diagram of the micro-architecture for a processor that includes logic circuits to perform dynamic cache hash changes between SNCs according to one embodiment.

FIG. 14 illustrates a block diagram of the micro-architecture for a processor 1400 that includes logic circuits to perform dynamic cache hash changes between SNCs according to one embodiment. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 1401 is the part of the processor 1400 that fetches instructions to be executed and prepares them to be used later in the processor pipeline. The embodiments of the page additions and content copying can be implemented in processor 1400.

The front end 1401 may include several units. In one embodiment, the instruction prefetcher 1416 fetches instructions from memory and feeds them to an instruction decoder 1418 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 1430 takes decoded uops and assembles them into program ordered sequences or traces in the uop queue 1434 for execution. When the trace cache 1430 encounters a complex instruction, the microcode ROM 1432 provides the uops needed to complete the operation.

Some instructions are converted into a single micro-op, whereas others need several micro-ops to complete the full operation. In one embodiment, if more than four micro-ops are needed to complete an instruction, the decoder 1418 accesses the microcode ROM 1432 to do the instruction. For one embodiment, an instruction can be decoded into a small number of micro ops for processing at the instruction decoder 1418. In another embodiment, an instruction can be stored within the microcode ROM 1432 should a number of micro-ops be needed to accomplish the operation. The trace cache 1430 refers to an entry point programmable logic array (PLA) to determine a correct micro-instruction pointer for reading the micro-code sequences to complete one or more instructions in accordance with one embodiment from the micro-code ROM 1432. After the microcode ROM 1432 finishes sequencing micro-ops for an instruction, the front end 1401 of the machine resumes fetching micro-ops from the trace cache 1430.

The out-of-order execution engine 1403 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 1402, slow/general floating point scheduler 1404, and simple floating point scheduler 1406. The uop schedulers 1402, 1404, 1406, determine when a uop is ready to execute based on the readiness of their dependent input register operand sources and the availability of the execution resources the uops need to complete their operation. The fast scheduler 1402 of one embodiment can schedule on each half of the main clock cycle while the other schedulers can only schedule once per main processor clock cycle. The schedulers arbitrate for the dispatch ports to schedule uops for execution.

Register files 1408, 1410, sit between the schedulers 1402, 1404, 1406, and the execution units 1412, 1414, 1416, 1418, 1410, 1412, 1414 in the execution block 1411. There is a separate register file 1408, 1410, for integer and floating point operations, respectively. Each register file 1408, 1410, of one embodiment also includes a bypass network that can bypass or forward just completed results that have not yet been written into the register file to new dependent uops. The integer register file 1408 and the floating point register file 1410 are also capable of communicating data with the other. For one embodiment, the integer register file 1408 is split into two separate register files, one register file for the low order 32 bits of data and a second register file for the high order 32 bits of data. The floating point register file 1410 of one embodiment has 128 bit wide entries because floating point instructions typically have operands from 64 to 128 bits in width.

The execution block 1411 contains the execution units 1412, 1414, 1416, 1418, 1410, 1412, 1414, where the instructions are actually executed. This section includes the register files 1408, 1410, that store the integer and floating point data operand values that the micro-instructions need to execute. The processor 1400 of one embodiment is comprised of a number of execution units: address generation unit (AGU) 1412, AGU 1414, fast ALU 1416, fast ALU 1418, slow ALU 1410, floating point ALU 1412, floating point move unit 1414. For one embodiment, the floating point execution blocks 1412, 1414, execute floating point, MMX, SIMD, and SSE, or other operations. The floating point ALU 1412 of one embodiment includes a 64 bit by 64 bit floating point divider to execute divide, square root, and remainder micro-ops. For embodiments of the present disclosure, instructions involving a floating point value may be handled with the floating point hardware.

In one embodiment, the ALU operations go to the high-speed ALU execution units 1416, 1418. The fast ALUs 1416, 1418, of one embodiment can execute fast operations with an effective latency of half a clock cycle. For one embodiment, most complex integer operations go to the slow ALU 1410 as the slow ALU 1410 includes integer execution hardware for long latency type of operations, such as a multiplier, shifts, flag logic, and branch processing. Memory load/store operations are executed by the AGUs 1412, 1414. For one embodiment, the integer ALUs 1416, 1418, 1410, are described in the context of performing integer operations on 64 bit data operands. In alternative embodiments, the ALUs 1416, 1418, 1410, can be implemented to support a variety of data bits including 16, 32, 128, 256, etc. Similarly, the floating point units 1412, 1414, can be implemented to support a range of operands having bits of various widths. For one embodiment, the floating point units 1412, 1414, can operate on 128 bits wide packed data operands in conjunction with SIMD and multimedia instructions.

In one embodiment, the uops schedulers 1402, 1404, 1406, dispatch dependent operations before the parent load has finished executing. As uops are speculatively scheduled and executed in processor 1400, the processor 1400 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The processor 1400 also includes logic to implement dynamic cache hash changes between SNCs according to one embodiment. In one embodiment, the execution block 1411 of processor 1400 may include MCU 115, to perform dynamic cache hash changes between SNCs according to the description herein.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data.

For the discussions herein, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 15:
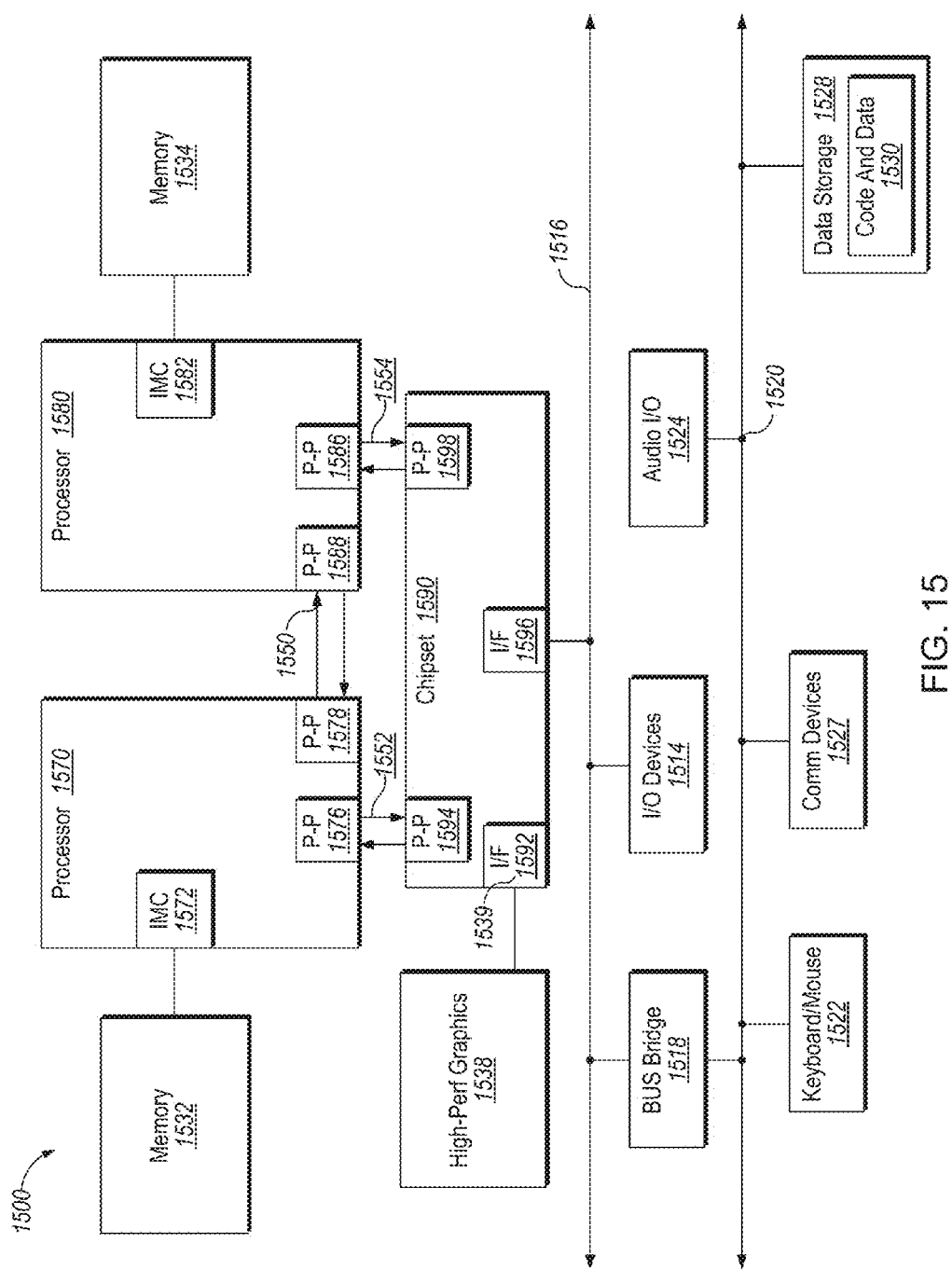
FIG. 15 is a block diagram of a computer system according to one implementation.

Embodiments may be implemented in many different system types. Referring now to FIG. 15, shown is a block diagram of a multiprocessor system 1500 in accordance with an implementation. As shown in FIG. 15, multiprocessor system 1500 is a point-to-point interconnect system, and includes a first processor 1570 and a second processor 1580 coupled via a point-to-point interconnect 1550. As shown in FIG. 15, each of processors 1570 and 1580 may be multicore processors, including first and second processor cores (i.e., processor cores 1574*a* and 1574*b* and processor cores 1584*a* and 1584*b*), although potentially many more cores may be present in the processors. The processors each may include hybrid write mode logics in accordance with an embodiment of the present. The embodiments of the page additions and content copying can be implemented in the processor 1570, processor 1580, or both.

While shown with two processors 1570, 1580, it is to be understood that the scope of the present disclosure is not so limited. In other implementations, one or more additional processors may be present in a given processor.

Processors 1570 and 1580 are shown including integrated memory controller units 1572 and 1582, respectively. Processor 1570 also includes as part of its bus controller units point-to-point (P-P) interfaces 1576 and 1588; similarly, second processor 1580 includes P-P interfaces 1586 and 1588. Processors 1570, 1580 may exchange information via a point-to-point (P-P) interface 1550 using P-P interface circuits 1578, 1588. As shown in FIG. 15, IMCs 1572 and 1582 couple the processors to respective memories, namely a memory 1532 and a memory 1534, which may be portions of main memory locally attached to the respective processors.

Processors 1570, 1580 may each exchange information with a chipset 1590 via individual P-P interfaces 1552, 1554 using point to point interface circuits 1576, 1594, 1586, 1598. Chipset 1590 may also exchange information with a high-performance graphics circuit 1538 via a high-performance graphics interface 1539.

A shared cache (not shown) may be included in either processor or outside of both processors, yet connected with the processors via P-P interconnect, such that either or both processors' local cache information may be stored in the shared cache if a processor is placed into a low power mode.

Chipset 1590 may be coupled to a first bus 1516 via an interface 1596. In one embodiment, first bus 1516 may be a Peripheral Component Interconnect (PCI) bus, or a bus such as a PCI Express bus or another third generation I/O interconnect bus, although the scope of the present disclosure is not so limited.

As shown in FIG. 15, various I/O devices 1514 may be coupled to first bus 1516, along with a bus bridge 1518 which couples first bus 1516 to a second bus 1520. In one embodiment, second bus 1520 may be a low pin count (LPC) bus. Various devices may be coupled to second bus 1520 including, for example, a keyboard and/or mouse 1522, communication devices 1527 and a storage unit 1528 such as a disk drive or other mass storage device which may include instructions/code and data 1530, in one embodiment. Further, an audio I/O 1524 may be coupled to second bus 1520. Note that other architectures are possible. For example, instead of the point-to-point architecture of FIG. 15, a system may implement a multi-drop bus or other such architecture.

Figure 16:
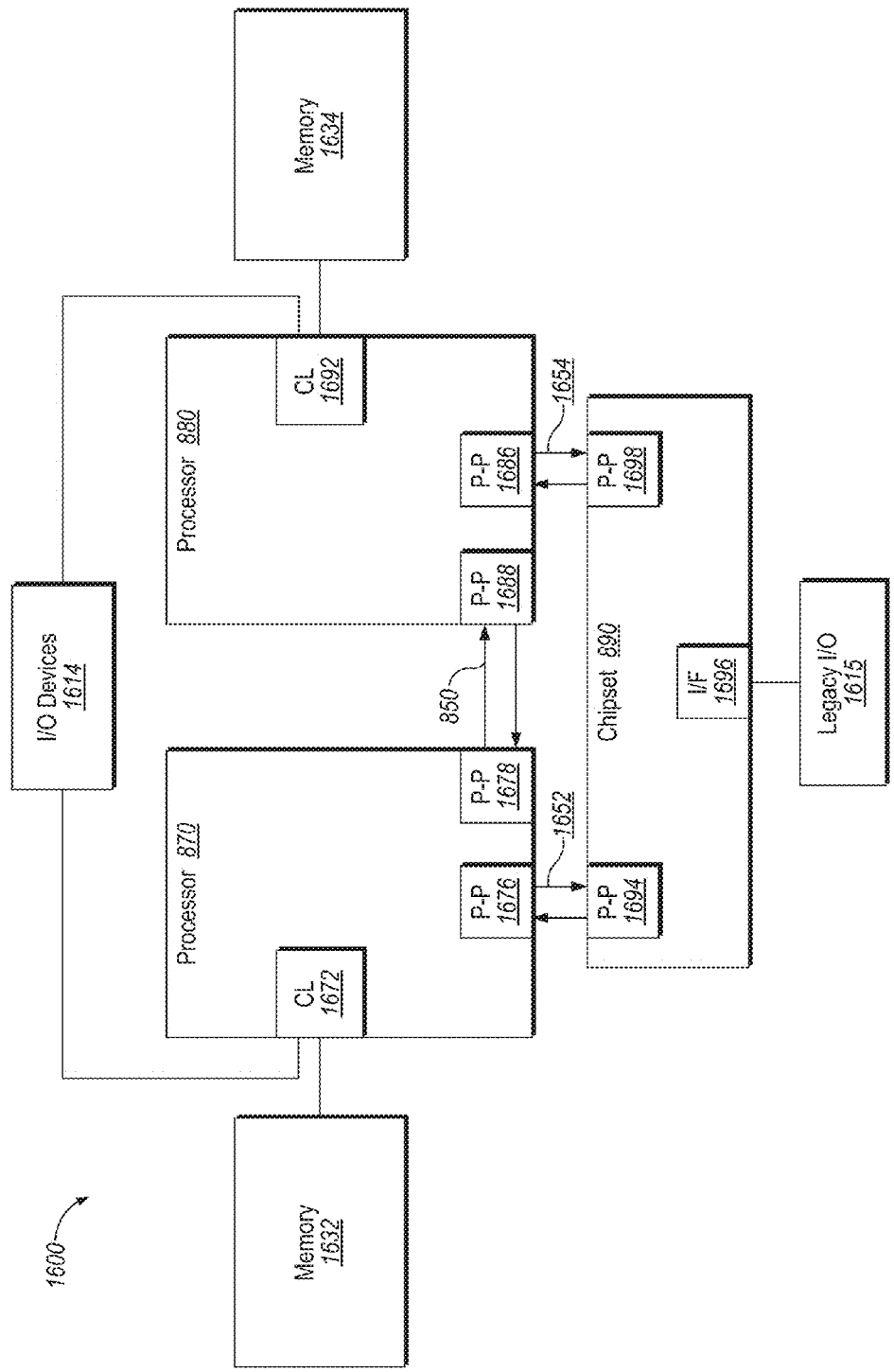
FIG. 16 is a block diagram of a computer system according to another implementation.

Referring now to FIG. 16, shown is a block diagram of a third system 1600 in accordance with an embodiment of the present invention. Like elements in FIGS. 15 and 16 bear like reference numerals, and certain aspects of FIG. 15 have been omitted from FIG. 15 in order to avoid obscuring other aspects of FIG. 16.

FIG. 16 illustrates that the processors 1670, 1680 may include integrated memory and I/O control logic ("CL") 1672 and 1682, respectively. For at least one embodiment, the CL 1672, 1682 may include integrated memory controller units such as described herein. In addition. CL 1672, 1682 may also include I/O control logic. FIG. 16 illustrates that the memories 1632, 1634 are coupled to the CL 1672, 1682, and that I/O devices 1614 are also coupled to the control logic 1672, 1682. Legacy I/O devices 1615 are coupled to the chipset 1690. The embodiments of the page additions and content copying can be implemented in processor 1670, processor 1680, or both.

Figure 17:
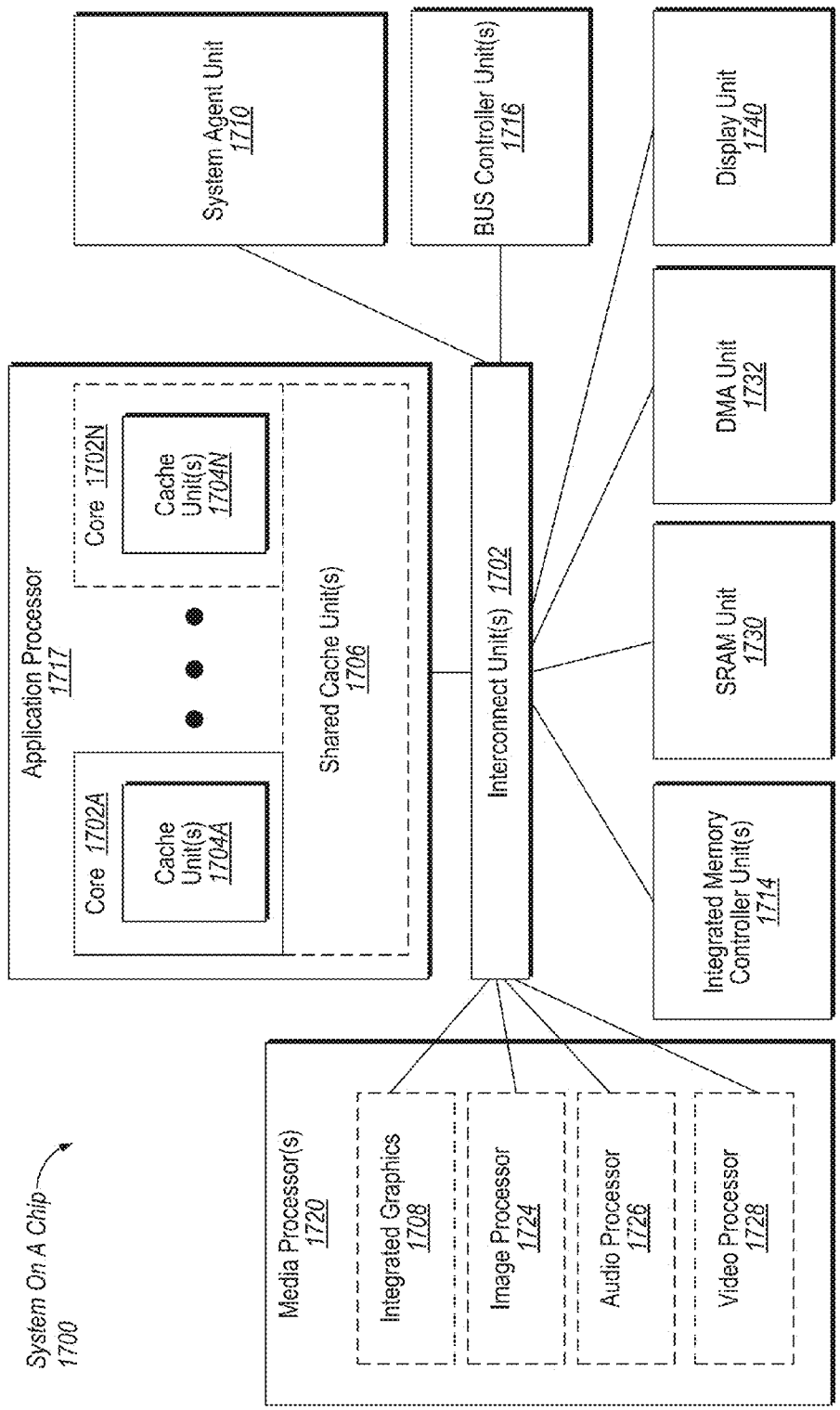
FIG. 17 is a block diagram of a system-on-a-chip according to one implementation.

FIG. 17 is an exemplary system on a chip (SoC) 1700 that may include one or more of the cores 1702. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

FIG. 17 is a block diagram of a SoC 1700 in accordance with an embodiment of the present disclosure. Dashed lined boxes are features on more advanced SoCs. In FIG. 17 an interconnect unit(s) 1702 is coupled to: an application processor 1717 which includes a set of one or more cores 1702A-N and shared cache unit(s) 1706; a system agent unit 1710; a bus controller unit(s) 1716; an integrated memory controller unit(s) 1714; a set or one or more media processors 1720 which may include integrated graphics logic 1708, an image processor 1724 for providing still and/or video camera functionality, an audio processor 1726 for providing hardware audio acceleration, and a video processor 1728 for providing video encode/decode acceleration; a static random access memory (SRAM) unit 1730; a direct memory access (DMA) unit 1732; and a display unit 1740 for coupling to one or more external displays. The embodiments of the pages additions and content copying can be implemented in SoC 1700.

Figure 18:
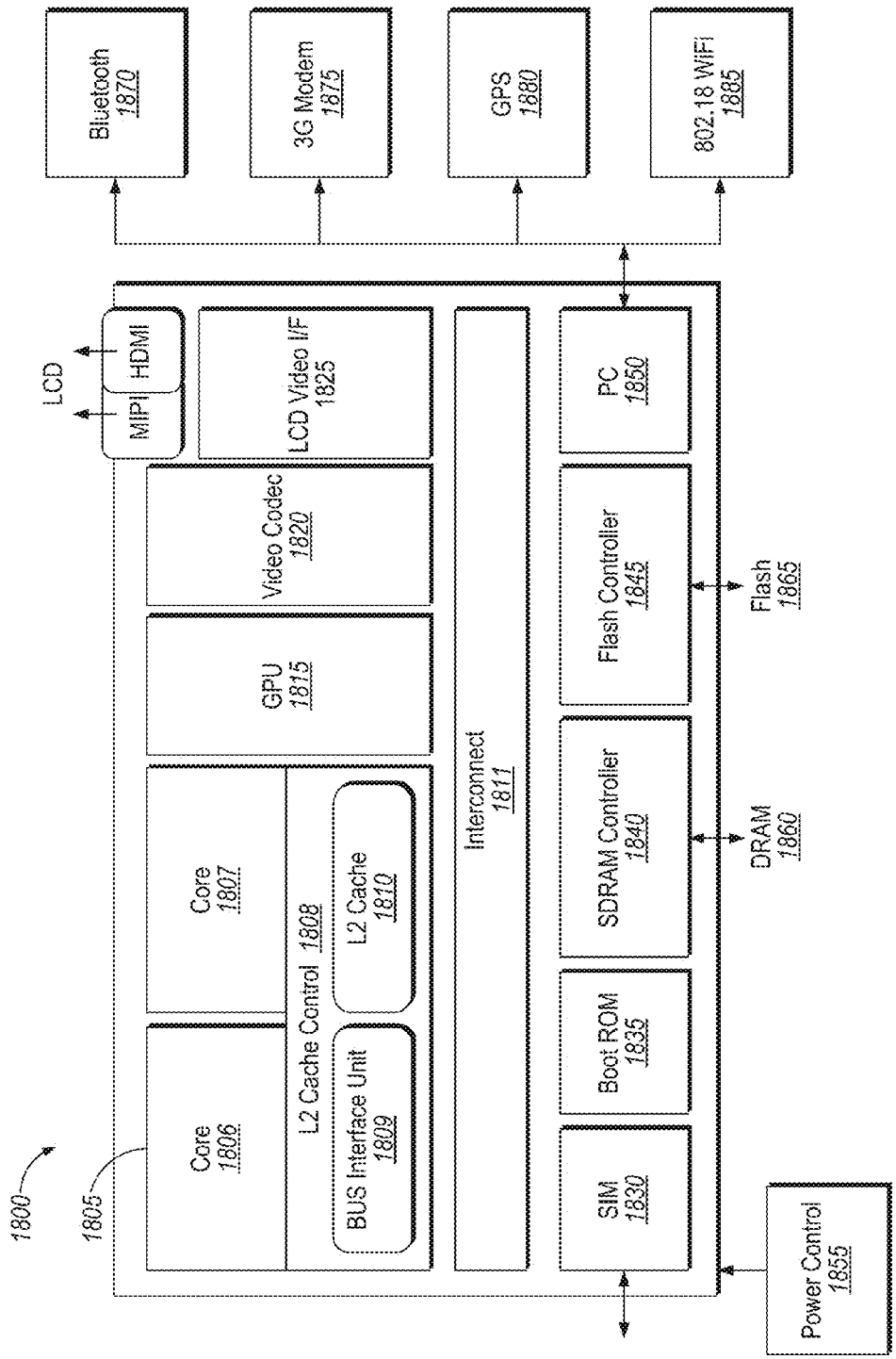
FIG. 18 illustrates another implementation of a block diagram for a computing system.

Turning next to FIG. 18, an embodiment of a system on-chip (SoC) design in accordance with embodiments of the disclosure is depicted. As an illustrative example, SoC 1800 is included in user equipment (UE). In one embodiment, UE refers to any device to be used by an end-user to communicate, such as a hand-held phone, smartphone, tablet, ultra-thin notebook, notebook with broadband adapter, or any other similar communication device. A UE may connect to a base station or node, which can correspond in nature to a mobile station (MS) in a GSM network. The embodiments of the page additions and content copying can be implemented in SoC 1800.

Here, SoC 1800 includes 2 cores—1806 and 1807. Similar to the discussion above, cores 1806 and 1807 may conform to an Instruction Set Architecture, such as a processor having the Intel® Architecture Core™, an Advanced Micro Devices, Inc. (AMD) processor, a MIPS-based processor, an ARM-based processor design, or a customer thereof, as well as their licensees or adopters. Cores 1806 and 1807 are coupled to cache control 1808 that is associated with bus interface unit 1809 and L2 cache 1810 to communicate with other parts of system 1800. Interconnect 1811 includes an on-chip interconnect, such as an IOSF, AMBA, or other interconnects discussed above, which can implement one or more aspects of the described disclosure.

Interconnect 1811 provides communication channels to the other components, such as a Subscriber Identity Module (SIM) 1830 to interface with a SIM card, a boot ROM 1835 to hold boot code for execution by cores 1806 and 1807 to initialize and boot SoC 1800, a SDRAM controller 1840 to interface with external memory (e.g. DRAM 1860), a flash controller 1845 to interface with non-volatile memory (e.g. Flash 1865), a peripheral control 1850 (e.g. Serial Peripheral Interface) to interface with peripherals, video codecs 1820 and Video interface 1825 to display and receive input (e.g. touch enabled input), GPU 1815 to perform graphics related computations, etc. Any of these interfaces may incorporate aspects of the embodiments described herein.

In addition, the system illustrates peripherals for communication, such as a Bluetooth module 1870, 3G modem 1875, GPS 1880, and Wi-Fi 1885. Note as stated above, a UE includes a radio for communication. As a result, these peripheral communication modules may not all be included. However, in a UE some form of a radio for external communication should be included.

Figure 19:
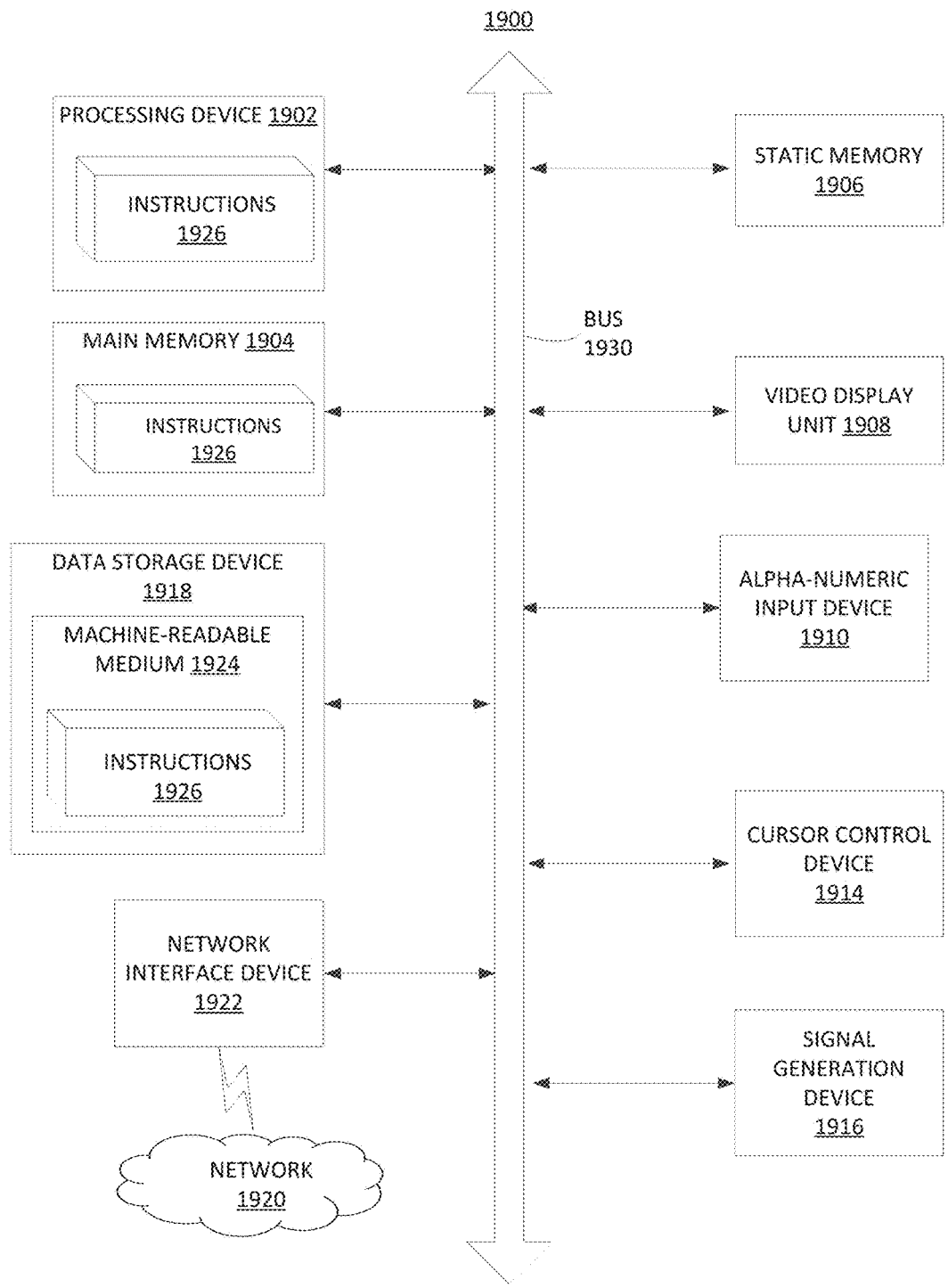
FIG. 19 illustrates another implementation of a block diagram for a computing system.

FIG. 19 illustrates a diagrammatic representation of a machine in the example form of a computing system 1900 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. The embodiments of the page additions and content copying can be implemented in computing system 1900.

The computing system 1900 includes a processing device 1902, main memory 1904 (e.g., read-only memory (ROM), flash memory, dynamic random access memory (DRAM) (such as synchronous DRAM (SDRAM) or DRAM (RDRAM), etc.), a static memory 1906 (e.g., flash memory, static random access memory (SRAM), etc.), and a data storage device 1918, which communicate with each other via a bus 1930.

Processing device 1902 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1902 may also be one or more special-purpose processing devices such as an application specific integrated circuit (ASIC), a field programmable gate array (FPGA), a digital signal processor (DSP), network processor, or the like. In one embodiment, processing device 1902 may include one or processor cores. The processing device 1902 is configured to execute the processing logic 1926 for performing the operations discussed herein. In one embodiment, processing device 1902 can be part of the computing system 100 of FIG. 1. Alternatively, the computing system 1900 can include other components as described herein. It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

The computing system 1900 may further include a network interface device 1908 communicably coupled to a network 1920. The computing system 1900 also may include a video display unit 1910 (e.g., a liquid crystal display (LCD) or a cathode ray tube (CRT)), an alphanumeric input device 1910 (e.g., a keyboard), a cursor control device 1914 (e.g., a mouse), a signal generation device 1916 (e.g., a speaker), or other peripheral devices. Furthermore, computing system 1900 may include a graphics processing unit 1922, a video processing unit 1928 and an audio processing unit 1932. In another embodiment, the computing system 1900 may include a chipset (not illustrated), which refers to a group of integrated circuits, or chips, that are designed to work with the processing device 1902 and controls communications between the processing device 1902 and external devices. For example, the chipset may be a set of chips on a motherboard that links the processing device 1902 to very high-speed devices, such as main memory 1904 and graphic controllers, as well as linking the processing device 1902 to lower-speed peripheral buses of peripherals, such as USB, PCI or ISA buses.

The data storage device 1918 may include a computer-readable storage medium 1924 on which is stored software 1926 embodying any one or more of the methodologies of functions described herein. The software 1926 may also reside, completely or at least partially, within the main memory 1904 as instructions 1926 and/or within the processing device 1902 as processing logic 1926 during execution thereof by the computing system 1900; the main memory 1904 and the processing device 1902 also constituting computer-readable storage media.

The computer-readable storage medium 1924 may also be used to store instructions 1926 utilizing the processing device 1902, such as described with respect to FIG. 1, and/or a software library containing methods that call the above applications. While the computer-readable storage medium 1924 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the present embodiments. The term "computer-readable storage medium" shall accordingly be taken to include, but not be limited to, solid-state memories, and optical and magnetic media.

The following examples pertain to further embodiments.

Example 1 is an apparatus comprising: 1) a processor to execute computer instructions, wherein 2) a first plurality of cores of the processor, a first memory controller, and a first plurality of cache slices co-located with the first plurality of cores are grouped into a first cluster, wherein 3) a second plurality of cores of the processor, a second memory controller, and a second plurality of cache lines co-located with the second plurality of cores are grouped into a second cluster; wherein the processor is to: a) store directory information in a memory coupled to the processor, the directory information to indicate cluster cache ownership of a first address space to the first cluster; b) in response to a request to change the cluster cache ownership of the first address space, remap first lines of the first plurality of cache slices, corresponding to the first address space, to second lines in the second plurality of cache slices of the second cluster; and c) update the directory information to change the cluster cache ownership of the first address space to the second cluster.

In Example 2, the apparatus of Example 1, further comprising a single quick path interconnect caching agent associated with the first and second clusters, wherein the first and second clusters comprise non-uniform memory address clusters or central processing unit clusters.

In Example 3, the apparatus of Example 1, wherein one memory controller of the first and second memory controllers to a) receive the request to change the cluster cache ownership and b) remap the first lines of the first plurality of cache slices to the second lines in the second plurality of cache slices, the one memory controller further to c) update a state in the directory of the first lines that are remapped based on a change to an address hash function corresponding to the change of cluster cache ownership of the first address space.

In Example 4, the apparatus of Example 3, wherein the directory comprises a plurality of states comprising: a) a first state to indicate a line cached in a local cluster of a local socket, b) a second state to indicate a line could be cached in any cluster in any socket, and c) a third state to indicate that a line is cached in a cache slice of a physically-closest cluster.

In Example 5, the apparatus of Example 4, wherein the second cluster is the cluster physically closest to the first cluster, and wherein to update the states of the directory of the first lines, the one memory controller further to: a) receive a data request for the first lines at the second cluster due to the change to the address hash function; b) determine that a state of the first lines in the directory is the first state; c) snoop the first cluster for the first lines based on the first state, causing the first cluster to forward data from the first lines to be stored as the second lines in the second plurality of cache slices of the second cluster; and d) change the state for the first lines in the directory to the third state based on a response from the snoop regarding the forwarded data.

In Example 6, the apparatus of Example 5, wherein the one memory controller further to: a) read the data from the second lines in the second plurality of cache slices of the second cluster to respond to the data request.

In Example 7, the apparatus of Example 5, wherein, after the first cluster has regained cluster cache ownership of the second lines, the one memory controller further to: a) receive a data request for the second lines at the first cluster due to a change in the hash function giving ownership of the second lines to the first cluster; b) determine that a state of the second lines in the directory is the third state; c) snoop the second cluster for the second lines based on the third state, causing the second cluster to forward data from the second lines to be stored as third lines in the first plurality of cache slices of the first cluster; d) update the state of the second lines in the directory to the first state based on a response to the snoop regarding the forwarded data; and e) read data from the third lines in the cache slices of the first cluster to respond to the data request.

In Example 8, the apparatus of claim 1, wherein the processor further to, before changing cluster cache ownership of the first lines to the second cluster: a) block new read or write requests to the first and second clusters; b) drain read or write requests issued on the first and second clusters; and c) remove the block on new read or write requests.

In Example 9, the apparatus of Example 8, wherein the processor further to: a) flush stale memory locations for the first lines in the first plurality of cache slices, wherein the flush occurs outside of a quiesce period to change the cluster cache ownership.

Various embodiments may have different combinations of the structural features described above. For instance, all optional features of the computing system described above may also be implemented with respect to the method or process described herein and specifics in the examples may be used anywhere in one or more embodiments.

In Example 10, a method comprising: 1) storing directory information in a directory stored in memory, the directory information to track cluster cache ownership of cache slices of at least first and second clusters, the first and second clusters each comprising a plurality of cores of a processor, a plurality of cache slices co-located with the plurality of cores, and a memory controller; 2) remapping first lines of a first plurality of cache slices of the first cluster to second lines in a second plurality of cache slices of the second cluster in response to a request to change the cluster cache ownership of a first address space of the first cluster to a second address space of the second cluster; and 3) updating the directory information to change the cluster cache ownership of the first address space to the second cluster.

In Example 11, the method of Example 10, further comprising: a) updating a state in the directory of the first lines that are remapped based on a change to an address hash function corresponding to the change of cluster cache ownership of the first address space.

In Example 12, the method of Example 11, wherein the directory comprises a plurality of states comprising: a) a first state to indicate a line cached in a local cluster of a local socket, b) a second state to indicate a line could be cached in any cluster in any socket, and c) a third state to indicate that a line is cached in a cache slice of a physically-closest cluster.

In Example 13, the method of Example 12, wherein the second cluster is the cluster physically closest to the first cluster, and wherein updating the states of the directory of the first lines comprises: a) receiving a data request for the first lines at the second cluster due to the change to the address hash function; b) determining that a state of the first lines in the directory is the first state; c) snooping the first cluster for the first lines based on the first state, causing the first cluster to forward data from the first lines to be stored as the second lines in the second plurality of cache slices of the second cluster; and d) changing the state for the first lines in the directory to the third state based on a response from the snoop regarding the forwarded data.

In Example 14, the method of Example 13, further comprising: a) reading the data from the second lines in the second plurality of cache slices of the second cluster to respond to the data request.

In Example 15, the method of Example 13, wherein, after the first cluster has regained cluster cache ownership of the second lines, the method further comprising: a) receiving a data request for the second lines at the first cluster due to a change in the hash function giving ownership of the second lines to the first cluster; b) determining that a state of the second lines in the directory is the third state; c) snooping the second cluster for the second lines based on the third state, causing the second cluster to forward data from the second lines to be stored as third lines in the first plurality of cache slices of the first cluster; d) updating the state of the second lines in the directory to the first state based on a response to the snoop regarding the forwarded data; and e) reading data from the third lines in the cache slices of the first cluster to respond to the data request.

In Example 16, the method of Example 10, wherein, before changing hash ownership of the lines to the second cluster, the method further comprising: a) blocking new read or write requests to the first and second clusters; b) draining read or write requests issued on the first and second clusters; and c) removing the block on new read or write requests.

In Example 17, the method of Example 16, further comprising: a) flushing stale memory locations for the first lines in the first cache slices outside of a quiesce period to change the cluster cache ownership.

Various embodiments may have different combinations of the structural features described above. For instance, all optional features of the processors and methods described above may also be implemented with respect to a system described herein and specifics in the examples may be used anywhere in one or more embodiments.

In Example 18, a system on a chip (SoC) comprises: 1) a local socket and 2) a remote socket each comprising a 3) plurality of clusters with which to execute instructions, wherein 4) a first plurality of cores, a first memory controller, and a first plurality of cache slices co-located with the first plurality of cores are grouped into a first cluster of the local socket, wherein 5) a second plurality of cores, a second memory controller, and a second plurality of cache lines co-located with the second plurality of cores are grouped into a second cluster of the local socket; wherein one memory controller of the first and second memory controllers is to: a) store directory information in a memory associated with the local socket, the directory information to indicate cluster cache ownership of a first address space to the first cluster; b) in response to a request to change the cluster cache ownership of the first address space, remap first lines of the first plurality of cache slices, corresponding to the first address space, to second lines in the second plurality of cache slices of the second cluster; and c) update the directory information to change the cluster cache ownership of the first address space to the second cluster.

In Example 19, the SoC of Example 18, further comprising: a) a single quick path interconnect caching agent associated with the first and second clusters, wherein the first and second clusters comprise non-uniform memory address clusters or central processing unit clusters.

In Example 20, the SoC of Example 18, wherein the one memory controller is to a) receive the request to change the cluster cache ownership and b) remap the first lines of the first plurality of cache slices to the second lines in the second plurality of cache slices, the one memory controller further to c) update a state in the directory of the first lines that are remapped based on a change to an address hash function corresponding to the change of cluster cache ownership of the first address space.

In Example 21, the SoC of Example 20, wherein the directory comprises a plurality of states comprising: a) a first state to indicate a line cached in a local cluster of the local socket, b) a second state to indicate a line could be cached in any cluster in any socket, and c) a third state to indicate that a line is cached in a cache slice of a physically-closest cluster.

In Example 22, the SoC of Example 21, wherein the second cluster is the cluster physically closest to the first cluster, and wherein to update the states of the directory of the first lines, the one memory controller further to: a) receive a data request for the first lines at the second cluster due to the change to the address hash function; b) determine that a state of the first lines in the directory is the first state; c) snoop the first cluster for the first lines based on the first state, causing the first cluster to forward data from the first lines to be stored as the second lines in the second plurality of cache slices of the second cluster; and d) change the state for the first lines in the directory to the third state based on a response from the snoop regarding the forwarded data.

In Example 23, the SoC of Example 22, wherein, after the first cluster has regained cluster cache ownership of the second lines, the one memory controller to: a) receive a data request for the second lines at the first cluster due to a change in the hash function giving ownership of the second lines to the first cluster; b) determine that a state of the second lines in the directory is the third state; c) snoop the second cluster for the second lines based on the third state, causing the second cluster to forward data from the second lines to be stored as third lines in the first plurality of cache slices of the first cluster; d) update the state of the second lines in the directory to the first state based on a response to the snoop regarding the forwarded data; and e) read data from the third lines in the cache slices of the first cluster to respond to the data request.

In Example 24, the SoC of Example 16, wherein the one memory controller further to, before changing cluster cache ownership of the first lines to the second cluster: a) block new read or write requests to the first and second clusters; b) drain read or write requests issued on the first and second clusters; and c) remove the block on new read or write requests.

In Example 25, the SoC of Example 24, wherein the one memory controller further to flush stale memory locations for the first lines in the first cache slices, wherein the flush occurs outside of a quiesce period to change hash ownership.

While the present invention has been described with respect to a limited number of embodiments, those skilled in the art will appreciate numerous modifications and variations therefrom. It is intended that the appended claims cover all such modifications and variations as fall within the true spirit and scope of this present invention.

In the description herein, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present invention. It will be apparent, however, to one skilled in the art that these specific details need not be employed to practice the present invention. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system have not been described in detail in order to avoid unnecessarily obscuring the present invention.

The embodiments are described with reference to dynamic cache hash changes between SNCs in specific integrated circuits, such as in computing platforms or microprocessors. The embodiments may also be applicable to other types of integrated circuits and programmable logic devices. For example, the disclosed embodiments are not limited to desktop computer systems or portable computers, such as the Intel® Ultrabooks™ computers. And may be also used in other devices, such as handheld devices, tablets, other thin notebooks, systems on a chip (SoC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. It is described that the system can be any kind of computer or embedded system. The disclosed embodiments may especially be used for low-end devices, like wearable devices (e.g., watches), electronic implants, sensory and control infrastructure devices, controllers, supervisory control and data acquisition (SCADA) systems, or the like. Moreover, the apparatuses, methods, and systems described herein are not limited to physical computing devices, but may also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future balanced with performance considerations.

Although the embodiments herein are described with reference to a processor, other embodiments are applicable to other types of integrated circuits and logic devices. Similar techniques and teachings of embodiments of the present invention can be applied to other types of circuits or semiconductor devices that can benefit from higher pipeline throughput and improved performance. The teachings of embodiments of the present invention are applicable to any processor or machine that performs data manipulations. However, the present invention is not limited to processors or machines that perform 512 bit, 256 bit, 128 bit, 64 bit, 32 bit, or 16 bit data operations and can be applied to any processor and machine in which manipulation or management of data is performed. In addition, the description herein provides examples, and the accompanying drawings show various examples for the purposes of illustration. However, these examples should not be construed in a limiting sense as they are merely intended to provide examples of embodiments of the present invention rather than to provide an exhaustive list of all possible implementations of embodiments of the present invention.

Although the below examples describe instruction handling and distribution in the context of execution units and logic circuits, other embodiments of the present invention can be accomplished by way of a data or instructions stored on a machine-readable, tangible medium, which when performed by a machine cause the machine to perform functions consistent with at least one embodiment of the invention. In one embodiment, functions associated with embodiments of the present invention are embodied in machine-executable instructions. The instructions can be used to cause a general-purpose or special-purpose processor that is programmed with the instructions to perform the steps of the present invention. Embodiments of the present invention may be provided as a computer program product or software which may include a machine or computer-readable medium having stored thereon instructions which may be used to program a computer (or other electronic devices) to perform one or more operations according to embodiments of the present invention. Alternatively, operations of embodiments of the present invention might be performed by specific hardware components that contain fixed-function logic for performing the operations, or by any combination of programmed computer components and fixed-function hardware components.

Instructions used to program logic to perform embodiments of the invention can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present invention.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the invention may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "defining," "receiving," "determining," "issuing," "linking," "associating," "obtaining," "authenticating," "prohibiting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

What is claimed is:

1. An apparatus comprising:
a processor to execute computer instructions, wherein a first plurality of cores of the processor, a first memory controller, and a first plurality of cache slices co-located with the first plurality of cores are grouped into a first cluster, wherein a second plurality of cores of the processor, a second memory controller, and a second plurality of cache lines co-located with the second plurality of cores are grouped into a second cluster;
wherein the processor is to:
store directory information in a memory coupled to the processor, the directory information to indicate cluster cache ownership of a first address space to the first cluster;
in response to a request to change the cluster cache ownership of the first address space, move addresses of first lines of the first plurality of cache slices, corresponding to the first address space, to second lines in the second plurality of cache slices of the second cluster, wherein the second plurality of cache slices correspond to a second address space; and
update the directory information to change the cluster cache ownership of the first address space to the second address space of the second cluster.

2. The apparatus of claim 1, further comprising a single quick path interconnect caching agent associated with the first and second clusters, wherein the first and second clusters comprise non-uniform memory address clusters or central processing unit clusters.

3. The apparatus of claim 1, wherein one memory controller of the first and second memory controllers to receive the request to change the cluster cache ownership and move addresses of the first lines of the first plurality of cache slices to the second lines in the second plurality of cache slices, the one memory controller further to update a state in the directory of the first lines based on a change to an address hash function corresponding to the change to the cluster cache ownership of the first address space.

4. The apparatus of claim 3, wherein the directory comprises a plurality of states comprising: a first state to indicate a line is cached in a local cluster of a local socket, a second state to indicate a line is cached in any cluster in any socket, and a third state to indicate that a line is cached in a cache slice of a physically-closest cluster.

5. The apparatus of claim 4, wherein the second cluster is the cluster physically closest to the first cluster, and wherein to update the states of the directory of the first lines, the one memory controller further to:
receive a data request for the first lines at the second cluster due to the change to the address hash function;
determine that a state of the first lines in the directory is the first state;
snoop the first cluster for the first lines based on the first state, causing the first cluster to forward data from the first lines to be stored as the second lines in the second plurality of cache slices of the second cluster; and
change the state for the first lines in the directory to the third state based on a response from the snoop regarding the forwarded data.

6. The apparatus of claim 5, wherein the one memory controller further to read the data from the second lines in the second plurality of cache slices of the second cluster to respond to the data request.

7. The apparatus of claim 5, wherein, after the first cluster has regained cluster cache ownership of the second address space, the one memory controller further to:
receive a data request for the second lines at the first cluster due to a change in the address hash function giving cluster cache ownership of the second lines to the first address space of the first cluster;
determine that a state of the second lines in the directory is the third state;
snoop the second cluster for the second lines based on the third state, causing the second cluster to forward data from the second lines to be stored as third lines in the first plurality of cache slices of the first cluster;
update the state of the second lines in the directory to the first state based on a response to the snoop regarding the forwarded data; and
read data from the third lines in the cache slices of the first cluster to respond to the data request.

8. The apparatus of claim 1, wherein the processor further to, before changing cluster cache ownership of the first address space to the second address space:
block new read or write requests to the first and second clusters;
drain read or write requests issued on the first and second clusters; and
remove the block on new read or write requests.

9. The apparatus of claim 8, wherein the processor further to flush stale memory locations for the first lines in the first plurality of cache slices, wherein the flush occurs outside of a quiesce period to change the cluster cache ownership to the second address space.

10. A method comprising:
storing directory information in a directory stored in memory, the directory information to track cluster cache ownership of an address space of at least first and second clusters, the first and second clusters each comprising a plurality of cores of a processor, a plurality of cache slices co-located with the plurality of cores, and a memory controller;
moving addresses of first lines of a first plurality of cache slices of the first cluster to second lines in a second plurality of cache slices of the second cluster in response to a request to change the cluster cache ownership of a first address space of the first cluster to a second address space of the second cluster; and
updating the directory information to change the cluster cache ownership of the first address space to the second address space of the second cluster.

11. The method of claim 10, further comprising updating a state in the directory of the first lines based on a change to an address hash function corresponding to the change to the cluster cache ownership of the first address space.

12. The method of claim 11, wherein the directory comprises a plurality of states comprising: a first state to indicate a line is cached in a local cluster of a local socket, a second state to indicate a line is cached in any cluster in any socket, and a third state to indicate that a line is cached in a cache slice of a physically-closest cluster.

13. The method of claim 12, wherein the second cluster is the cluster physically closest to the first cluster, and wherein updating the states of the directory of the first lines comprises:
receiving a data request for the first lines at the second cluster due to the change to the address hash function;
determining that a state of the first lines in the directory is the first state;
snooping the first cluster for the first lines based on the first state, causing the first cluster to forward data from the first lines to be stored as the second lines in the second plurality of cache slices of the second cluster; and
changing the state for the first lines in the directory to the third state based on a response from the snoop regarding the forwarded data.

14. The method of claim 13, further comprising reading the data from the second lines in the second plurality of cache slices of the second cluster to respond to the data request.

15. The method of claim 13, wherein, after the first cluster has regained cluster cache ownership of the second address space, the method further comprising:
receiving a data request for the second lines at the first cluster due to a change in the address hash function giving cluster cache ownership of the second lines to the first address space of the first cluster;
determining that a state of the second lines in the directory is the third state;
snooping the second cluster for the second lines based on the third state, causing the second cluster to forward data from the second lines to be stored as third lines in the first plurality of cache slices of the first cluster;
updating the state of the second lines in the directory to the first state based on a response to the snoop regarding the forwarded data; and
reading data from the third lines in the cache slices of the first cluster to respond to the data request.

16. The method of claim 10, wherein, before changing cluster cache ownership of the first address space to the second address space, the method further comprising:
blocking new read or write requests to the first and second clusters;
draining read or write requests issued on the first and second clusters; and
removing the block on new read or write requests.

17. The method of claim 16, further comprising flushing stale memory locations for the first lines in the first cache slices outside of a quiesce period to change the cluster cache ownership to the second address space.

18. A system on a chip (SoC) comprising:
a local socket and a remote socket each comprising a plurality of clusters with which to execute instructions, wherein a first plurality of cores, a first memory controller, and a first plurality of cache slices co-located with the first plurality of cores are grouped into a first cluster of the local socket, wherein a second plurality of cores, a second memory controller, and a second plurality of cache lines co-located with the second plurality of cores are grouped into a second cluster of the local socket;

wherein one memory controller of the first and second memory controllers is to:

store directory information in a memory associated with the local socket, the directory information to indicate cluster cache ownership of a first address space by the first cluster;

in response to a request to change the cluster cache ownership of the first address space, move addresses of first lines of the first plurality of cache slices, corresponding to the first address space, to second lines in the second plurality of cache slices of the second cluster, the second plurality of cache slices corresponding to a second address space; and update the directory information to change the cluster cache ownership of the first address space to the second address space of the second cluster.

19. The SoC of claim 18, further comprising a single quick path interconnect caching agent associated with the first and second clusters, wherein the first and second clusters comprise non-uniform memory address clusters or central processing unit clusters.

20. The SoC of claim 18, wherein the one memory controller is to receive the request to change the cluster cache ownership and move the addresses of the first lines of the first plurality of cache slices to the second lines in the second plurality of cache slices, the one memory controller further to update a state in the directory of the first lines based on a change to an address hash function corresponding to the change to the cluster cache ownership of the first address space.

21. The SoC of claim 20, wherein the directory comprises a plurality of states comprising: a first state to indicate a line is cached in a local cluster of the local socket, a second state to indicate a line is cached in any cluster in any socket, and a third state to indicate that a line is cached in a cache slice of a physically-closest cluster.

22. The SoC of claim 21, wherein the second cluster is the cluster physically closest to the first cluster, and wherein to update the states of the directory of the first lines, the one memory controller further to:

receive a data request for the first lines at the second cluster due to the change to the address hash function;

determine that a state of the first lines in the directory is the first state;

snoop the first cluster for the first lines based on the first state, causing the first cluster to forward data from the first lines to be stored as the second lines in the second plurality of cache slices of the second cluster; and change the state for the first lines in the directory to the third state based on a response from the snoop regarding the forwarded data.

23. The SoC of claim 22, wherein, after the first cluster has regained cluster cache ownership of the second address space, the one memory controller to:

receive a data request for the second lines at the first cluster due to a change in the address hash function giving cluster cache ownership of the second lines to the first address space of the first cluster;

determine that a state of the second lines in the directory is the third state;

snoop the second cluster for the second lines based on the third state, causing the second cluster to forward data from the second lines to be stored as third lines in the first plurality of cache slices of the first cluster;

update the state of the second lines in the directory to the first state based on a response to the snoop regarding the forwarded data; and read data from the third lines in the cache slices of the first cluster to respond to the data request.

24. The SoC of claim 22, wherein the one memory controller further to, before changing cluster cache ownership of the first address space to the second address space:

block new read or write requests to the first and second clusters;

drain read or write requests issued on the first and second clusters; and remove the block on new read or write requests.

25. The SoC of claim 24, wherein the one memory controller further to flush stale memory locations for the first lines in the first cache slices, wherein the flush occurs outside of a quiesce period to change cluster cache ownership to the second address space.

* * * * *